United States Patent
Nakata et al.

(10) Patent No.: US 9,701,022 B2
(45) Date of Patent: Jul. 11, 2017

(54) ROBOT MALFUNCTION INDICATION METHOD

(71) Applicant: Panasonic Intellectual Property Management Co., Ltd., Osaka (JP)

(72) Inventors: Hiroyuki Nakata, Osaka (JP); Atsumi Hashimoto, Osaka (JP); Masaru Kowa, Osaka (JP); Yasuyoshi Honuchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/583,297

(22) Filed: Dec. 26, 2014

(65) Prior Publication Data

US 2015/0112480 A1    Apr. 23, 2015

Related U.S. Application Data

(63) Continuation of application No. PCT/JP2013/006250, filed on Oct. 23, 2013.

(30) Foreign Application Priority Data

Oct. 25, 2012  (JP) .................. 2012-235308

(51) Int. Cl.
  *B25J 9/16*   (2006.01)
  *G06F 17/11*  (2006.01)
  *B25J 19/06*  (2006.01)

(52) U.S. Cl.
  CPC ........... *B25J 9/1674* (2013.01); *B25J 9/1676* (2013.01); *B25J 19/06* (2013.01); *G06F 17/11* (2013.01);

(Continued)

(58) Field of Classification Search
  CPC ........ B25J 9/1674; B25J 9/1676; B25J 19/06; G06F 17/11; G06F 11/327;
  (Continued)

(56) References Cited

U.S. PATENT DOCUMENTS 5,204,598 A * 4/1993 Torii ................. B25J 9/1674
                                                318/563
6,129,099 A * 10/2000 Foster ................ B08B 1/02
                                                134/111

(Continued)

FOREIGN PATENT DOCUMENTS

CN   102152308   8/2011
CN   102233588   11/2011

(Continued)

OTHER PUBLICATIONS

Office Action issued Oct. 10, 2015, in corresponding Chinese Application No. 201380047719.4 (English translation).

(Continued)

*Primary Examiner* — Abby Lin
(74) *Attorney, Agent, or Firm* — Wenderoth, Lind & Ponack, L.L.P.

(57) ABSTRACT

In sensor-less collision detection of a robot, a conventional method for displaying abnormality of the robot makes an abnormality display of "collision detected" when a collision is erroneously detected, and does not clarify the situations under which the collision has been erroneously detected. In a method for displaying abnormality of a robot, when a collision of the robot is detected and the collision detection is displayed, at least one abnormality display is selected from a plurality of abnormality detection items different from collision detection. This can offer information useful for the user to understand the situations at occurrence of the erroneous collision detection.

8 Claims, 20 Drawing Sheets

(52) U.S. Cl.
CPC ............. *G05B 2219/37622* (2013.01); *G05B 2219/37624* (2013.01); *Y10S 901/49* (2013.01)

(58) Field of Classification Search
CPC G05B 2219/37622; G05B 2219/37624; Y10S 901/49
See application file for complete search history.

(56) References Cited

U.S. PATENT DOCUMENTS

| | | | |
|---|---|---|---|
| 7,328,123 | B2 | 2/2008 | Hooge et al. |
| 2006/0033462 | A1* | 2/2006 | Moridaira ............ B25J 9/1674 318/568.12 |
| 2011/0035043 | A1* | 2/2011 | Liu ................... H01L 21/67253 700/110 |
| 2011/0196533 | A1 | 8/2011 | Scheurer et al. |
| 2011/0257785 | A1 | 10/2011 | Nihei et al. |
| 2012/0048027 | A1 | 3/2012 | Hashiguchi et al. |
| 2014/0121837 | A1 | 5/2014 | Hashiguchi et al. |

FOREIGN PATENT DOCUMENTS

| | | |
|---|---|---|
| CN | 102323822 | 1/2012 |
| JP | 63-245389 | 10/1988 |
| JP | 4-98402 | 3/1992 |
| JP | 7-104835 | 4/1995 |
| JP | 8-229864 | 9/1996 |
| JP | 10-315173 | 12/1998 |
| JP | 11-165291 | 6/1999 |
| JP | 2000-052286 | 2/2000 |
| JP | 2001-333594 | 11/2001 |
| JP | 2002-56476 | 2/2002 |
| JP | 3367641 | 1/2003 |
| JP | 2005-102427 | 4/2005 |
| JP | 2006-263916 | 10/2006 |
| JP | 2011-000699 | 1/2011 |
| JP | 2011-189430 | 9/2011 |
| JP | 2012-139772 | 7/2012 |

OTHER PUBLICATIONS

International Search Report of PCT application No. PCT/JP2013/006250 dated Dec. 3, 2013.
Kazuhiro Kosuge and Taishi Matsumoto, "Dynamic Collision Detection Method for Manipulator", Transactions of Robotics and Mechatronics Conference 1999 of the Japan Society of Mechanical Engineers, No. 99-9, 2A1-11-030(1-2).
Extended European Search Report issued Sep. 19, 2016 in European Patent Application No. 13849941.3.

* cited by examiner

In normal state

At detection of motor lock

ROBOT MALFUNCTION INDICATION METHOD

BACKGROUND OF THE INVENTION

1. Technical Field

The present disclosure relates to a method for displaying abnormality of a robot that is driven by motors via decelerators.

2. Background Art

With recent global expansion of the robot market, handling a robot in which a failure or an abnormality has occurred has become an important problem. For example, if display of the abnormality of the robot does not show the actual state of the failure, a serviceperson needs to go directly to the site where the abnormality has occurred, check the situations, and thereafter take measures. As a result, it is difficult to promptly solve abnormal states every part of the world.

Of course, it is also necessary to address collision of a robot with objects therearound that is caused not by a failure in the robot but, for example, by erroneous teaching from the user. If a robot and objects around the robot are broken by a collision, a serviceperson needs to be dispatched for repair and it may be some time before the robot is returned to a normal state. Accordingly, it is desired that to enhance the accuracy of collision detection. For example, a high-accuracy collision sensor may be installed in a robot in order to promptly detect failure in the robot. However, a high-accuracy collision sensor installed in a robot is an excessive weight load for the robot, which increases the cost. Therefore, in recent years, higher-accuracy sensor-less collision detection has been promoted.

However, the higher-accuracy sensor-less collision detection increases the possibility of erroneously detecting an abnormal state of a robot as a collision even when no actual collision has occurred. That is, when a failure of the robot has occurred, a collision detection function detects that a collision has occurred as an abnormality before other abnormality detection functions are able to detect whether a abnormality different from the collision has occurred. This poses a possibility of erroneously displaying "occurrence of collision" even though no collision has occurred. As described above, the higher-accuracy sensor-less collision detection has an advantage of promptly detecting a failure, but makes it difficult for the cause of the failure to be identified. The reasons why collision is erroneously detected are described with reference to FIG. 1 through FIG. 12.

FIG. 1 is a schematic configuration diagram of a vertical articulated six-shaft robot as a typical example of a robot. As shown in FIG. 1, the vertical articulated six-shaft robot has robot mechanism (101), robot controller (102), and operation display unit (103).

FIG. 2 is a flowchart showing whole processing of an abnormality display. The whole processing of the abnormality display is performed in robot controller (102). Besides collision detection processing, FIG. 2 includes motor lock detection processing, overload detection processing, and position deviation over detection processing for detecting abnormality at occurrence of a failure in the robot. The whole processing of the abnormality display shown in FIG. 2 is repeated every cycle $\Delta T$, where several milliseconds are assumed for the cycle $\Delta T$.

With reference to FIG. 2, motor lock detection processing is performed in Step 2-1. In Step 2-6, upon detection of a motor lock, "motor lock detected" is shown in operation display unit (103) of FIG. 1, as an abnormality display. When a motor lock is detected, an abnormal state has already occurred and an abnormality display is made. Thus, in Step 2-6, the abnormality display processing is completed. When no motor lock is detected in Step 2-6, processing proceeds to Step 2-2.

Next, in Step 2-2, overload detection processing is performed. In Step 2-7, upon detection of an overload, "overload detected" is shown in operation display unit (103) of FIG. 1, as an abnormality display. When an overload is detected, an abnormal state has already occurred and an abnormality display is made. Thus, in Step 2-7, the abnormality display processing is completed. When no overload is detected in Step 2-7, processing proceeds to Step 2-3.

Next, in Step 2-3, position deviation over detection processing is performed. In Step 2-8, upon detection of a position deviation over, "position deviation over detected" is displayed in operation display unit (103) of FIG. 1, as an abnormality display. When a position deviation over is detected, an abnormal state has already occurred and an abnormality display is made. Thus, in Step 2-8, the abnormality display processing is completed. When no position deviation over is detected in Step 2-8, processing proceeds to Step 2-4.

Next, in Step 2-4, collision detection processing is performed. The processing will be described below with reference to FIG. 3.

Methods for calculating collision force in a sensor-less manner include a dynamic operation method and a disturbance estimation observer method. In the dynamic operation method, first, decelerator output torque is calculated by subtracting, from the torque generated by the driving current of the motor, the torque lost by the inertia of a motor and decelerator and the friction. Next, collision force is calculated by subtracting the dynamic torque of the robot obtained by the dynamic operation of the robot, from the decelerator output torque (see Non-Patent Literature 1, for example). In the disturbance estimation observer method, collision force is calculated with a disturbance estimation observer (see Patent Literature 1, for example). Hereinafter, with reference to FIG. 3, as an example, a description is provided for the dynamic operation method, which is excellent in estimation accuracy.

FIG. 3 is a control block diagram in the dynamic operation method. With reference to FIG. 3, position control block (6) receives motor position $\theta m$ (4), and position command $\theta com$ (3) obtained by integrating velocity component $d\theta com$ of position command (1) with integration element 40. Based on the value of difference between position command $\theta com$ (3) and motor position $\theta m$ (4), velocity loop command $\omega com$ (7) is output from position proportional gain (5).

With reference to FIG. 3, velocity control block (10) receives velocity loop command $\omega com$ (7) and motor position $\theta m$ (4). The velocity control block obtains the value of difference between velocity loop command $\omega com$ (7) and motor velocity $\omega m$ (2) calculated by differentiating motor position $\theta m$ (4) with differentiation element (32). Then, the velocity control block outputs motor current Im (11) via velocity proportional gain (8) and velocity integration gain (9).

With reference to FIG. 3, in block showing motor and external force (18), $\tau m$ (13) is motor generating torque. Assuming that the decelerator is a rigid body, $\tau m$ is expressed by Equation (1) on the motor driving side and expressed by Equation (2) on the load side.

$$\tau m = Kt \times Im \tag{1}$$

$$\tau m = \tau dyn + \tau dis + Jm \times \alpha m \pm D \times \omega m \pm \tau \mu \tag{2}$$

The marks in Equation (1) and Equation (2) have the following meanings:
- Kt (12): Motor torque constant
- Im (11): Motor current
- αm (90): Motor acceleration (differentiation value of ωm)
- ωm (2): Motor velocity
- Jm (89): Motor inertia (rotor+primary side of decelerator)
- D (20): Viscous friction coefficient
- τμ (15): Dynamic friction torque
- τdyn (14): Dynamic torque (sum of gravity torque, inertial force, centrifugal force, and Coriolis force)
- τdis (16): Collision torque Dynamic friction torque τμ (15) can be calculated by the following Equation (3):

$$\tau\mu = K\mu \times sgn \tag{3}$$

In this Equation, Kμ is a magnitude of dynamic friction, sgn is "1" when ωm>0, "0" when ωm=0, and "−1" when ωm<0.

Collision torque τdis (16) can be obtained by changing Equation (1) and Equation (2) into the following Equation (4):

$$\tau dis = Kt \times Im \cdot (Jm \times \alpha m + D \times \omega m + \tau\mu + \tau dyn) \tag{4}$$

In FIG. 3, Equation (4) is expressed as collision torque estimation block (30).

In collision torque estimation block (30), dynamic torque estimation value τdyno (29) can be obtained by a dynamic operation performed by dynamic torque operation block (26). Dynamic torque operation block (26) performs the dynamic operation using motor position θm (4) of each of all the shafts forming the robot, motor velocity ωm (2) obtained by differentiating motor position θm (4), motor acceleration αm (90) obtained by differentiating motor velocity ωm (2), and mechanics parameters (arm length, arm mass, gravity position, and inertia around gravity position) of the robot. Using this dynamic torque estimation value τdyno (29), collision torque estimation block (30) outputs collision torque estimation value τdiso (28) to collision determination block (31).

Collision determination block (31) detects a collision, using predetermined collision detection threshold τth, in accordance with the following Expression (5):

$$|\tau diso| > \tau th \tag{5}$$

In Step 2-5, the following processing is performed. When Expression (5) holds, "collision detected" is displayed as an abnormality display in operation display unit (103) of the robot shown in FIG. 1, and the abnormality display processing is completed. When Expression (5) does not hold, the abnormality display processing is completed without the abnormality display. The whole processing of the abnormality display is started every cycle ΔT.

In the collision detection as described above, accurate calculation of dynamic torque estimation value τdyno (29) can provide accurate collision torque estimation value τdiso (28).

The methods for calculating the dynamic torque in dynamic torque operation block (26) include the Lagrangian method and the Newton-Euler method. In the Lagrangian method, a vertical articulated six-shaft robot requires product-sum operations at a little less than 100 thousand times. However, the processing capability of a present CPU achieves this amount of operations within several milliseconds. The Newton-Euler method requires product-sum operations only at a little less than 10 thousand times, and thus the operation time poses no problem. However, the Newton-Euler method is a so-called recurrence formula method, in which the result of previous expression is used for the next expression, and thus a cumulative error in operation can occur. However, when processing is made on data of 32 bit or higher, the cumulative error in operation poses no problem. Therefore, in each of the methods, the present CPU can calculate dynamic torque τdyn (14) within a tolerance of a 10% motor maximum torque ratio. When the terms other than dynamic torque τdyn (14) on the right side of Equation (4) can also be calculated within a tolerance of a 10% motor maximum torque ratio, collision torque estimation value τdiso (28) can be obtained within a tolerance of a 20% motor maximum torque ratio.

The collision detection in accordance with Expression (5) uses an instantaneous value of collision torque estimation value τdiso (28) obtained by Equation (4). Thus, after a lapse of several milliseconds, i.e. a calculation time, dynamic torque τdyn (14) can be determined. That is, in the collision detection function, after an abnormality at a motor maximum torque ratio of approximately 20% is observed only for several milliseconds, a collision can be detected.

However, if collision detection threshold τth is set low (at a motor maximum torque ratio of approximately 20%), even an abnormality other than collision is detected immediately. For instance, suppose a failure in a motor (bearing or brake) or a decelerator increases the actual dynamic friction torque. In this case, if the robot is attempted to operate in a manner similar to that in the normal state, motor generating torque τm needs to be increased by the increment of dynamic friction torque τμ. In order to increase motor generating torque τm, motor current Im on the right side of Equation (4) is increased. However, dynamic friction torque τμ on the right side of Equation (4) is calculated, using the values measured in the normal state, and thus collision torque τdis on the left side of Equation (4) increases although no collision has occurred. If the magnitude of collision torque τdis becomes greater than a motor maximum torque ratio of 20% only for several milliseconds, a collision is erroneously detected.

In the method for calculating collision force in a sensorless manner, the causes of increases in motor current Im on the right side of Equation (4) and in collision torque τdis cannot be identified. That is, it cannot be identified whether the increases are caused by the actual collision of the robot or by the increase in friction torque resulting from a failure in the motor or the decelerator. Thus, if collision detection threshold τth is set low (i.e. higher collision detection sensitivity) so that the damage at the collision of the robot is minimized, the probability of erroneous collision detection is increased.

On the other hand, aside from the collision detection function, a motor lock detection function and an overload detection function are provided as functions for detecting that rotation of a motor has been slowed by a failure in the motor (bearing and brake) or the decelerator.

The motor lock detection function detects the situations where the motor continues to be difficult to move even when the user attempts to operate the motor. If motor generating torque τm (shown in Equation (1)) is equal to or greater than predetermined motor torque threshold τmth (91) but the friction torque increased by the failure is large, motor velocity ωm (2) does not exceed predetermined motor velocity threshold ωmth. When this state continues for predetermined motor lock detection time threshold LKth or longer, the motor lock detection function determines that the state is abnormal.

A description is provided for the motor lock detection function with reference to FIG. 5A and FIG. 5B. FIG. 5A is a graph showing motor velocity ωm (2) and motor generating torque τm (13) in the normal state. After motor generating torque τm (13) has exceeded motor torque threshold τmth (91), and time LKO (95), which is shorter than motor lock detection time threshold LKth, (93) has elapsed, motor velocity ωm (2) exceeds motor velocity threshold ωmth (92). In this case, a motor lock is not detected.

FIG. 5B is a graph showing motor velocity ωm (2) and motor generating torque τm (13) in the abnormal state where a motor lock that has resulted from an increase in friction torque caused by a failure in a motor or a decelerator is detected. In FIG. 5B, even after motor generating torque τm (13) has exceeded motor toque threshold τmth (91), the increase in friction torque caused by the failure in the motor or the decelerator makes the increase in motor velocity ωm (2) slower than that in the normal state (shown by the dotted line). Thus, motor velocity ωm (2) does not reach motor velocity threshold ωmth (92) even when motor lock detection time threshold LKth (93) is exceeded. In this case, a motor lock is detected.

FIG. 4 is a flowchart for motor lock detection. The motor lock detection processing is performed every constant cycle ΔT.

In Step 4-1, it is determined whether or not motor generating torque τm is equal to or greater than motor torque threshold τmth (91). When motor generating torque τm is equal to or greater than motor torque threshold τmth (91), the determination is "Y" and processing proceeds to Step 4-2.

In Step 4-2, it is determined whether or not motor velocity ωm (2) is equal to or less than motor velocity threshold ωmth (92). When motor velocity ωm (2) is equal to or less than motor velocity threshold ωmth (92), the determination is "Y" and processing proceeds to Step 4-3.

In Step 4-3, motor lock duration time LKdet is calculated by Equation (6), and processing proceeds to Step 4-5.

$$LKdet = LKdet + \Delta T \quad (6).$$

Here, ΔT is a motor lock detection processing cycle.

That is, in Step 4-3, measurement is made by adding the time lengths when "Y" is determined both in Step 4-1 and Step 4-2 every motor lock detection processing cycle ΔT.

When the determination in Step 4-1 or Step 4-2 is "N", processing proceeds to Step 4-4 and motor lock duration time LKdet is reset to 0. Thus, the motor lock detection processing is completed.

In Step 4-5, it is determined whether or not motor lock duration time LKdet is equal to or greater than motor lock detection time threshold LKth (93) in accordance with following Expression (7):

$$LKdet \geq LKth \quad (7)$$

When motor lock duration time LKdet is equal to or greater than motor lock detection time threshold KLth (93), the determination is "Y", and processing proceeds to Step 4-6. In this case, it is determined that the motor is in a motor lock state, and the motor is stopped in Step 4-6. Subsequently, in Step 4-7, "motor lock detected" is shown as an abnormality display, and the motor lock detection processing is completed. The abnormality display is shown in operation display unit (103) of FIG. 1.

When the determination in Step 4-5 is "N", it is determined that the motor is not in the motor lock state, and the motor lock detection processing is completed.

In this motor lock detection function, time LKO (95) is taken for a motor to reach a motor velocity equal to or greater than motor velocity threshold ωmth (92) with a motor torque equal to or greater than motor torque threshold τmth (91) in the normal state. Thus, motor lock detection time threshold LKth (93) needs to be set longer than time LKO (95) taken in the normal state. The taken time varies with the size of the robot, and motor lock detection time threshold LKth (93) ranges from several hundred milliseconds to several seconds, which is longer than the detection performed within several milliseconds by the collision detection function. That is, if collision detection threshold τth is set low (e.g. higher collision detection sensitivity), a collision is detected earlier than detection of a motor lock, even though no actual collision has occurred. Thus, only "collision detected" is shown as an abnormality display. This phenomenon is described with reference to FIG. 2. While the determination in the motor lock detection in Step 2-6 stays "N", the determination in the collision detection in Step 2-5 is "Y".

Next, an overload detection function is described.

In the overload detection function, an overload abnormality is detected so that the time-cumulative value of the current for driving the motor does not exceed the limit value of the motor time-limit characteristic curve. The motor generating torque is proportional to the current for driving the motor, and the limit value of the motor time-limit characteristic curve shows the upper limit of the temperature of the windings of the motor. FIG. 7 is a graph showing the relation between the motor current for driving the motor and a time. For instance, the limit value (dotted line) of the motor time-limit curve shown in FIG. 7 is approximately 100 seconds at a maximum current ratio of 40%, 25 seconds at a maximum current ratio of 50%, and approximately 8 seconds at a maximum current ratio of 70%. Overload detection is made so that the time-cumulative value is equal to or less than this limit value.

FIG. 6 is a flowchart for overload detection. Overload detection processing is performed every constant cycle ΔT.

In Step 6-1, overload detection value OLdet is obtained by the following Equation (8):

$$OLdet = OLdet + (|Im| - Imth) \times \Delta T \quad (8).$$

Here, Imth is an overload detection current threshold and ΔT is an overload detection cycle.

Next, in Step 6-2, it is determined whether or not overload detection value OLdet is equal to or greater than overload threshold OLth. That is, it is determined whether or not conditions for the following Expression (9) are satisfied.

$$OLdet \geq OLth \quad (9)$$

When Expression (9) holds, the determination is "Y", that is, the motor is in the overload state, and processing proceeds to Step 6-3. In Step 6-3, the motor is stopped. Subsequently, in Step 6-4, "overload detected" is shown as an "abnormality display", and the overload detection processing is completed. The "abnormality display" is shown in operation display unit (103) of FIG. 1.

When the determination in Step 6-2 is "N", it is determined that the motor is not in the overload state, and the overload detection processing is completed.

In FIG. 8, an overload detection threshold characteristic of OLdet=OLth in Expression (9) is shown by the solid line. The overload detection threshold characteristic (solid line) in FIG. 8 shows the case where Imth=33 and OLth=100. The overload detection threshold characteristic (solid line) is set less than the limit value (dotted line). This shows that the method for calculating overload detection value OLdet shown in Equation (8) is adequate.

As shown in FIG. 8, overload detection takes several seconds even when the motor current is at a maximum current ratio of 100%. The time taken for this overload detection is longer than that of the detection performed within several milliseconds by the collision detection function. That is, if a failure occurs in a motor or a decelerator from the state where no overload abnormality occurs, the motor rotates slowly, which increases the motor current (motor generating torque) at a maximum current ratio of approximately 20%. In this manner, when a failure occurs in a motor or a decelerator, detection of overload abnormality takes several seconds at minimum. Thus, it is highly possible that a collision is erroneously detected before the detection of the overload abnormality. This phenomenon is described with reference to FIG. 2. While the determination in the overload detection in Step 2-7 stays "N", the determination in the collision detection in Step 2-5 is "Y".

Next, a description is provided for erroneous detection in the collision detection processing shown in FIG. 3.

That is, also when an abnormality occurs in motor position detector (99) for detecting motor position θm (4), a collision can be detected erroneously.

Dynamic torque operation block (26) uses motor acceleration αm (90) generated by differentiating motor position θm (4) twice. Thus, a change in motor position θm (4) considerably affects motor acceleration αm (90).

Generally, differentiation in digital control is performed with a difference between the present sample value and the sample value in the previous cycle. An example is shown below.

FIG. 9 is a graph showing motor position waveforms at occurrence of abnormality of the motor position detector. FIG. 10 is a graph showing velocity waveforms at occurrence of the abnormality of the motor position detector. FIG. 11 is a graph showing acceleration waveforms at occurrence of the abnormality of the motor position detector. These graphs show the waveforms when the motor reaches the state where motor velocity ωm (2) is 50 rotations/second (=3000 rpm) for 0.5 second at an equal acceleration (100 rotations/second$^2$) from the stop state where motor position θm (4) is at the zero position. Here, the sample cycle is repeated every five milliseconds, and motor position θm (4) after 500 milliseconds is where the motor has made approximately 12.5 rotations as shown in FIG. 9. FIG. 9 shows the case where abnormality of motor position detector (99) at a time point of 300 milliseconds has hindered reading of motor position θm (4). In this case, motor position θm (4) in the previous sample value (at a time point of 295 milliseconds) is not updated and remains.

When error eθm (86) in motor position θm (4) at occurrence of the abnormality at a time point of 300 milliseconds is calculated in reference to the value after 500 milliseconds (12.5 rotations), the error is approximately 4.7% (approximately 0.15 rotation). When error eωm (87) in motor velocity ωm (2) is calculated in reference to the value after 500 milliseconds (50 rotations/second) in FIG. 10, the error is approximately 120%. When error eαm (88) in motor velocity αm (90) is calculated in reference to the value after 500 milliseconds (100 rotations/second$^2$) in FIG. 11, the error is approximately −3333%. Therefore, it is highly possible that these errors considerably affect the accuracy of dynamic torque τdyn (14) to be obtained in dynamic torque operation block (26) and cause erroneous detection of a collision.

In the method for calculating collision force in a sensorless manner, the cause of no change in motor position θm (4) cannot be identified. That is, it is unclear whether an actual collision has stopped the robot or abnormality of motor position detector (99) has hindered update of motor position θm (4). Thus, when the collision detection function is attempted to operate effectively, erroneous collision detection cannot be avoided.

On the other hand, aside from the collision detection function, a position deviation over detection function is used as a function of detecting abnormality of motor position detector (99) for detecting motor position θm (4).

Next, a description is provided for the position deviation over detection function.

FIG. 12 is a flowchart for position deviation over detection. Position deviation over detection processing is performed every constant cycle ΔT.

In Step 12-1, as shown in the following Equation (10), position deviation over detection value Met is calculated as the absolute value of the difference between position command θcom (3) and motor position θm (4):

$$\theta det = |\theta com - \theta m| \quad (10)$$

In Step 12-2, position deviation over detection value θdet is compared with position deviation over detection threshold θth, and it is determined whether or not conditions for the following Expression (11) are satisfied.

$$\theta det \geq \theta th \quad (11)$$

When position deviation over detection value Met is equal to or greater than position deviation over detection threshold θth, the determination is "Y", and processing proceeds to Step 12-3. In this case, a position deviation over state is determined and the motor is stopped in Step 12-3. Subsequently, "position deviation over" is shown as an abnormality display in Step 12-4, and the position deviation over detection processing is completed. The abnormality display is shown in operation display unit (103) of FIG. 1.

When the determination in Step 12-2 is "N", no position deviation over state is determined and the position deviation over detection processing is completed.

In order to prevent erroneous detection of the position deviation caused by a control delay in this position deviation over detection, position deviation over detection threshold θth in Expression (11) is set to approximately several rotations.

For instance, suppose that the position deviation caused by a control delay is one rotation and position deviation over detection threshold θth is set to two rotations. In this case, even when the error in motor position θm (4) (approximately 0.15 rotation) at occurrence of the abnormality at 300 milliseconds in FIG. 9 is added, position deviation over detection value Met is approximately 1.15 rotations. Thus, Expression (11) does not hold, and position deviation over is not detected. However, this considerably affects the accuracy of dynamic torque τdyn (14) to be calculated in dynamic torque operation block (26), and thus a collision is detected erroneously. That is, a collision is detected earlier, even though no actual collision has occurred. Thus, only "collision detected" is shown as an abnormality display. This phenomenon is described with reference to FIG. 2. While the determination in the position deviation over detection in Step 2-8 stays "N", the determination in the collision detection in Step 2-5 is "Y".

As abnormality display processing at occurrence of collision detection in Step 2-5 in FIG. 2, conventional processing of a single abnormality display shown in FIG. 20 is performed.

As described above, since abnormality detections in Step 2-1 through Step 2-3 take time, collision detection in Step 2-4 is performed earlier and only "collision detected" is shown as an abnormality display in Step 2-5.

Related prior arts are Japanese Patent No. 3367641 and Kosuga Kazuhiro et. al., "Dynamic Collision Detection of Manipulator", The Japan Society of Mechanical Engineers [No. 99-9] Lecture theses of Robotics and Mechatronics Lecture Meeting in 1999 2A1-11-030.

SUMMARY OF THE INVENTION

In a conventional method for calculating collision force in a sensor-less manner, it cannot be identified whether detection of a collision has resulted from an actual collision of a robot or from the other causes. Thus, even when detection of the collision has resulted from a cause other than an actual collision, only "collision detected" is shown, and it is unclear that what situations have caused erroneous detection of the collision.

The present disclosure addresses the above problem and provides a method for displaying abnormality of a robot that can offer information useful for the user to understand the situations when a collision is erroneously detected.

In order to address the above problem, in a method for displaying abnormality of a robot of the present disclosure, a plurality of types of abnormality, including at least collision, is detected as corresponding values detected with the robot in operation, and occurrence of the abnormality is displayed. Further, the method includes a collision detection step for detecting a collision of the robot. Further, the method includes a collision detection display step for showing the collision detection as an abnormality display. Further, the method includes an abnormality display step for also showing, as an abnormality display, occurrence of the abnormality for at least one of a plurality of abnormality detection items different from the collision detection.

Preferably, in the method for displaying the abnormality of the robot of the present disclosure, in addition to the above, the abnormality display may be selected from the plurality of abnormality detection items and made in the abnormality display step.

Preferably, in the method for displaying the abnormality of the robot of the present disclosure, in addition to the above, an abnormality determination threshold and a display/non-display determination threshold smaller than the abnormality determination threshold are set for each of the plurality of abnormality detection items. Based on the abnormality determination threshold, the abnormality is determined. Based on the display/non-display determination threshold, it is determined whether or not occurrence of the abnormality is to be displayed when the collision of the robot is detected and the collision detection is displayed. Further, for each of the plurality of abnormality detection items whose abnormality determination value as a value detected with the robot in operation is greater than the display/non-display determination threshold, occurrence of the abnormality may be shown as the abnormality display.

Preferably, in the method for displaying the abnormality of the robot of the present disclosure, in addition to the above, an abnormality determination threshold and a display/non-display determination threshold smaller than the abnormality determination threshold may be set for each of the plurality of abnormality detection items. Based on the abnormality determination threshold, the abnormality is determined. Based on the display/non-display determination threshold, it is determined whether or not occurrence of the abnormality is to be displayed when the collision of the robot is detected and the collision detection is displayed. Further, preferably, priority may be given to the plurality of abnormality detection items. Further, for each of the items having higher priority in order, it may be determined whether or not an abnormality determination value as a value detected with the robot in operation is greater than the display/non-display determination threshold. Further, the abnormality display may be made only for one of the abnormality detection items whose abnormality determination value is greater than the display/non-display determination threshold. Further, for the abnormality detection items having priority lower than the abnormality detection item for which the abnormality display has been made, neither determination of whether or not the abnormality determination value is greater than the display/non-display determination threshold nor the abnormality display may be made.

Preferably, in the method for displaying the abnormality of the robot of the present disclosure, in addition to the above, the display/non-display determination threshold for each of the abnormality detection items may be determined based on a predetermined collision detection threshold.

Preferably, in the method for displaying the abnormality of the robot of the present disclosure, in addition to the above, for each of the abnormality detection items, a rate of an abnormality determination value as a value detected with the robot in operation with respect to an abnormality determination threshold may be obtained. Further, together with display of collision detection, the abnormality display may be made only for one of the abnormality detection items whose rate of the abnormality determination value is the highest.

Preferably, in the method for displaying the robot of the present disclosure, in addition to the above, an abnormality determination threshold for determining the abnormality may be set for each of the plurality of abnormality detection items. Further, for each of the plurality of abnormality detection items, a rate of an abnormality determination value as a value detected with the robot in operation with respect to the abnormality determination threshold may be obtained. Further, when the collision of the robot is detected, the rate of the abnormality determination value may be displayed for each of the abnormality detection items together with display of the collision detection.

Preferably, in the method for displaying the abnormality of the robot of the present disclosure, in addition to the above, an abnormality determination threshold for determining the abnormality may be set for each of the plurality of abnormality detection items. Further, for each of the plurality of abnormality detection items, a rate of an abnormality determination value as a value detected with the robot in operation with respect to the abnormality determination threshold may be obtained. Further, when the collision of the robot is detected, the rate of the abnormality determination value may be displayed only for each of the abnormality detection items whose abnormality determination value is greater than a display/non-display determination threshold, together with display of the collision detection.

Preferably, in the method for displaying the abnormality of the robot of the present disclosure, in addition to the above, the plurality of abnormality detection items include at least one of detection of a lock of a motor for driving the robot, overload detection of the motor, and position deviation detection of the robot.

As described above, in the method for displaying the abnormality of the robot of the present disclosure, display of the situations of other abnormality detection measures at occurrence of collision detection helps the user understand the operation situations of the robot when a collision is erroneously detected.

DETAILED DESCRIPTION OF THE INVENTION

First Exemplary Embodiment

Hereinafter, a description is provided for the first exemplary embodiment of the present disclosure with reference to the accompanying drawings. Elements similar to those described in the background art have the same reference marks and the detailed description of these elements is omitted.

Figure 1:
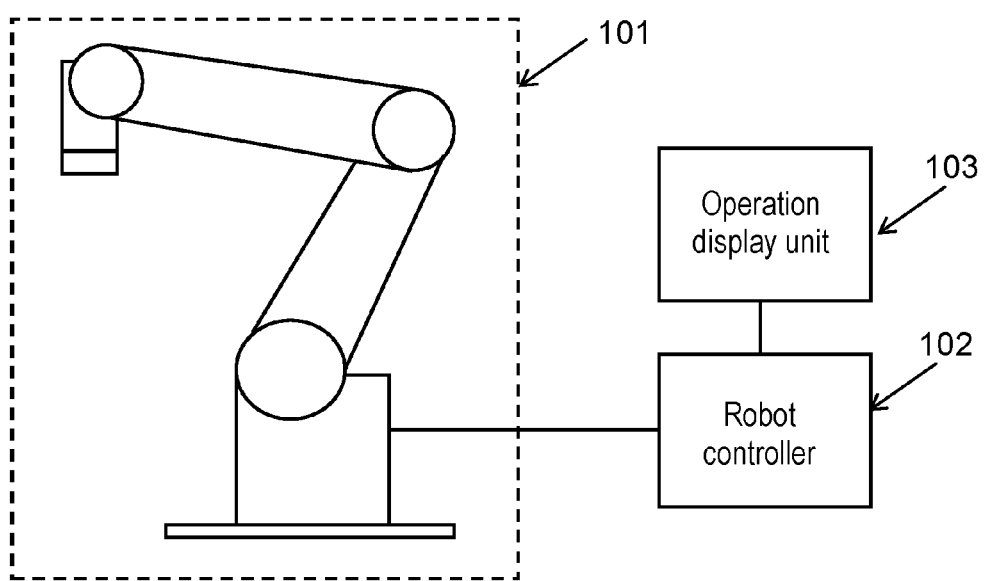
FIG. 1 is a diagram showing a schematic configuration of a vertical articulated six-shaft robot as a typical example to which the present disclosure is applied.
Figure 2:
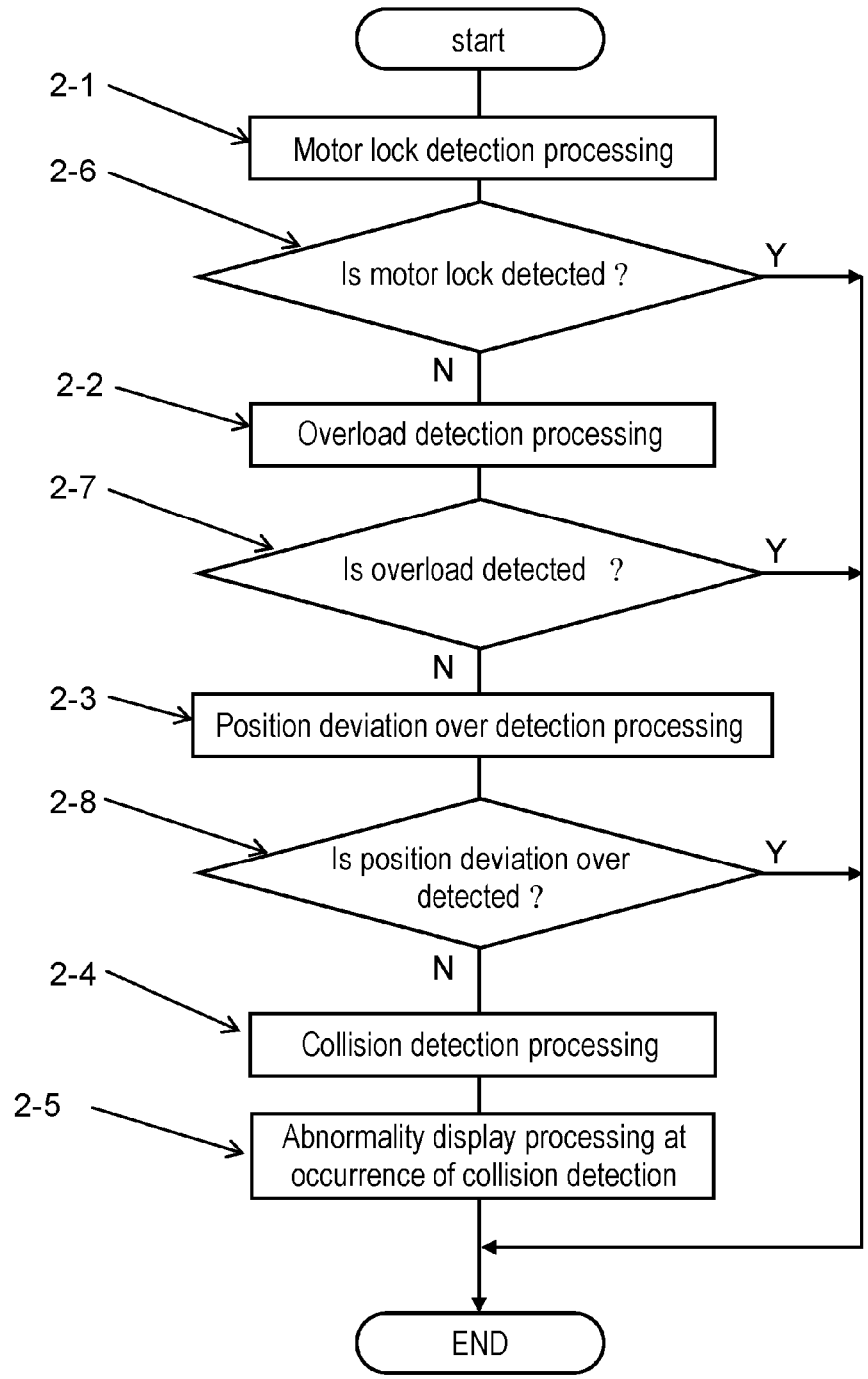
FIG. 2 is a flowchart showing whole processing of an abnormality display in accordance with exemplary embodiments of the present disclosure.
Figure 3:
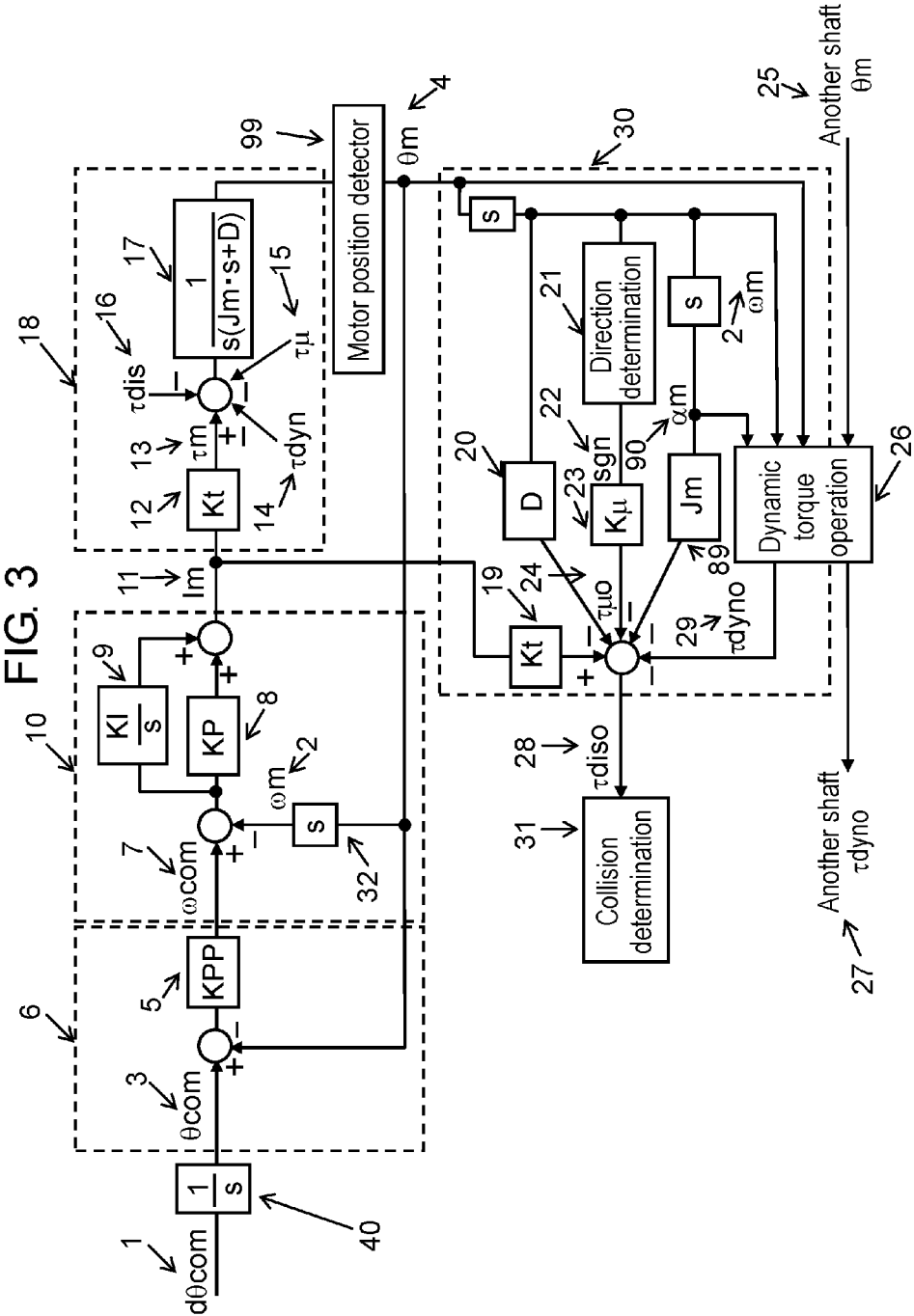
FIG. 3 is a control block diagram in a dynamic operation method in accordance with the exemplary embodiments.
Figure 4:
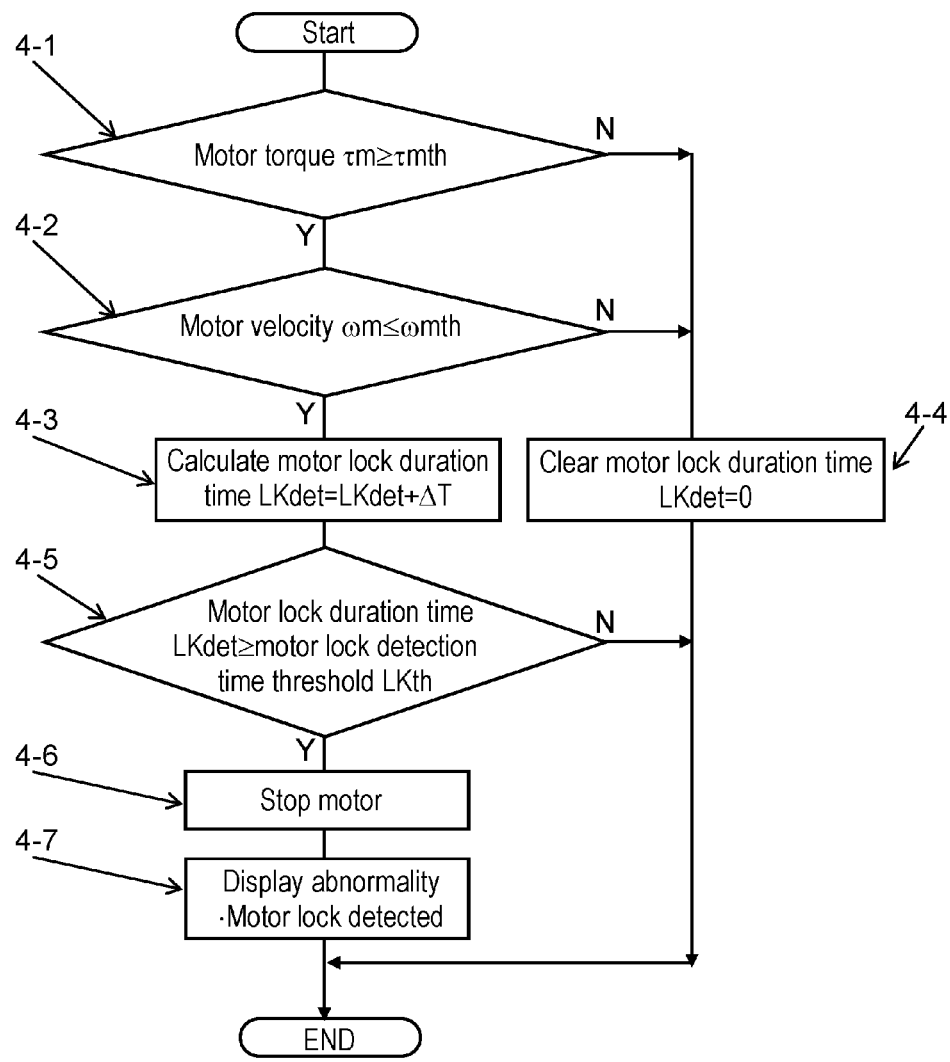
FIG. 4 is a flowchart for motor lock detection in accordance with the exemplary embodiments.
Figure 5A:
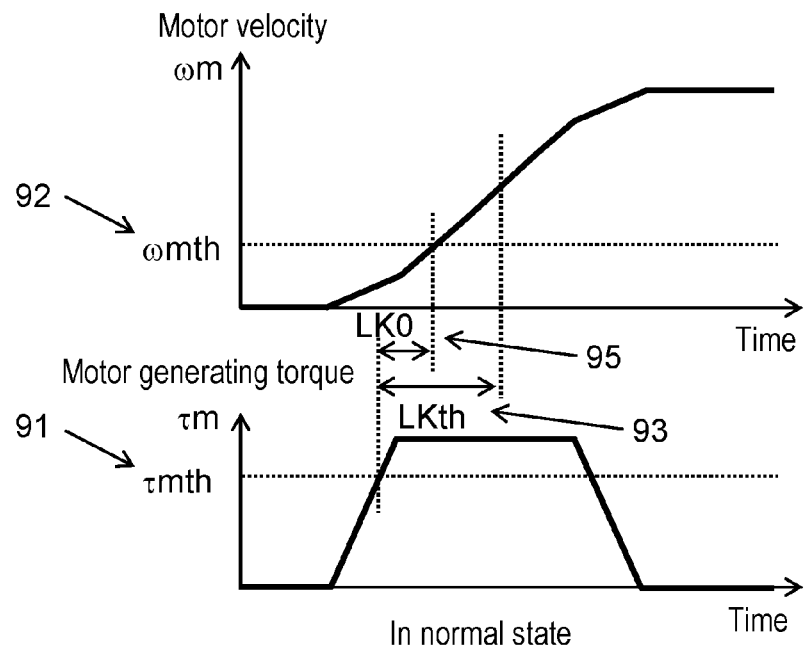
FIG. 5A is a graph showing time changes in a motor velocity and motor torque in a normal state.
Figure 5B:
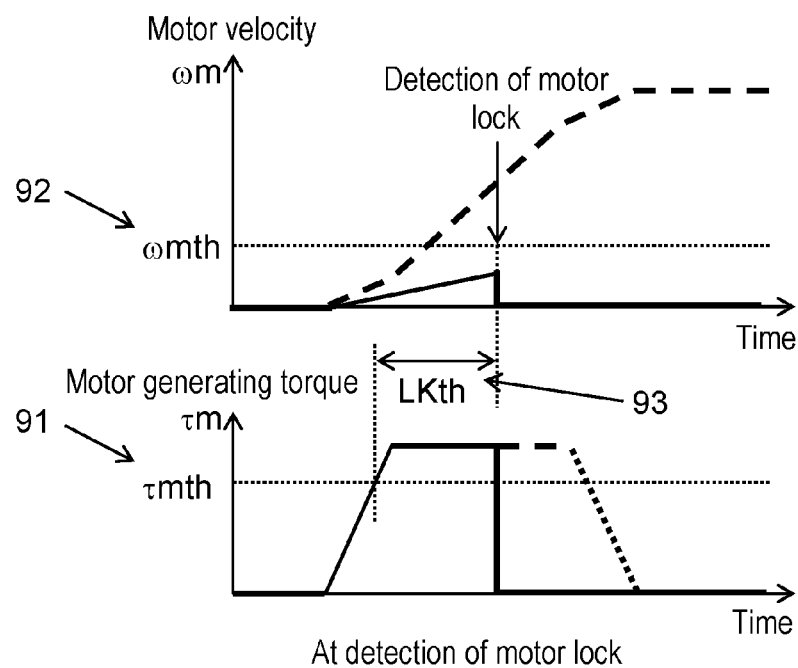
FIG. 5B is a graph showing time changes in a motor velocity and motor torque when a motor lock is detected.
Figure 6:
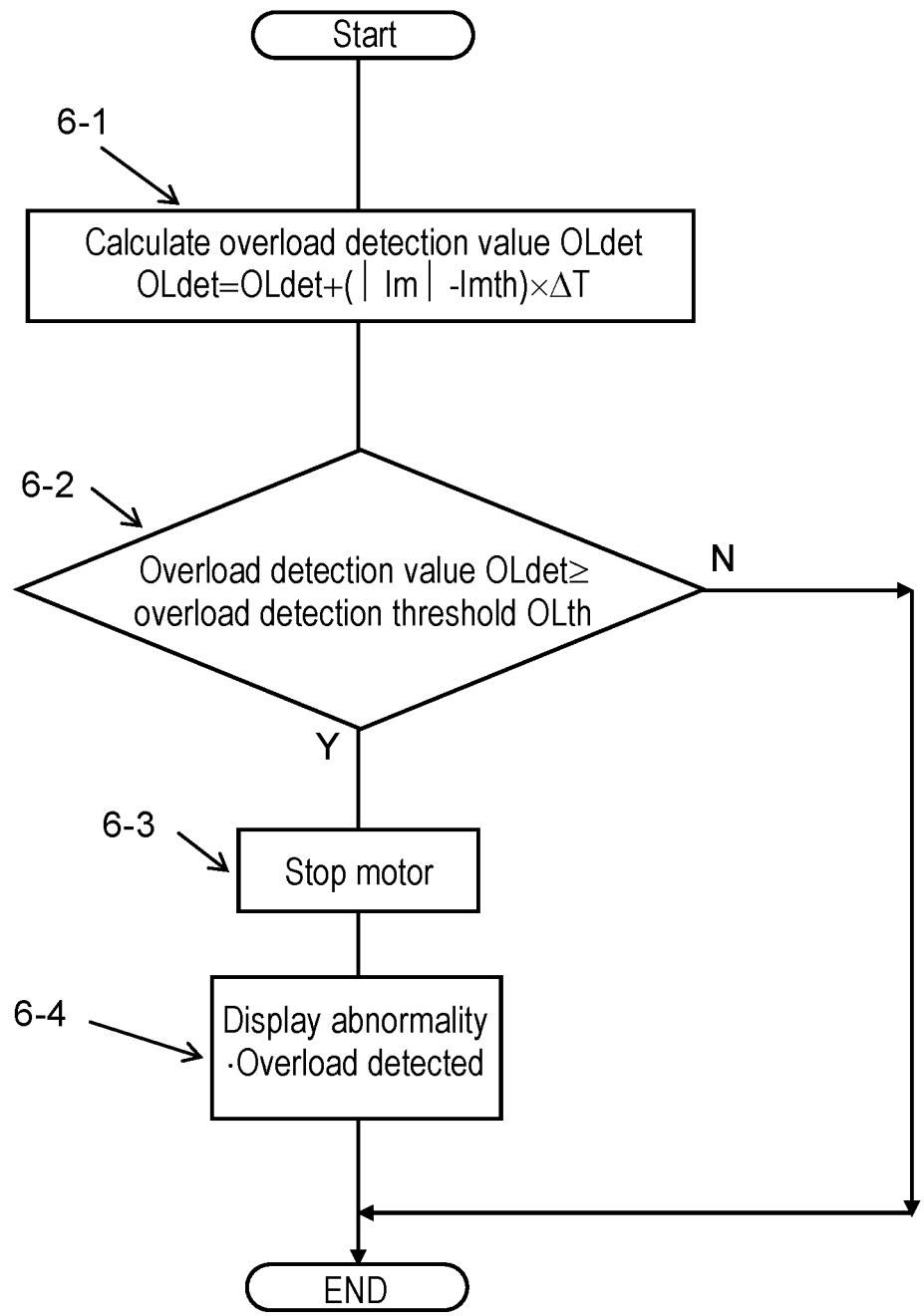
FIG. 6 is a flowchart showing overload detection in accordance with the exemplary embodiments of the present disclosure.
Figure 7:
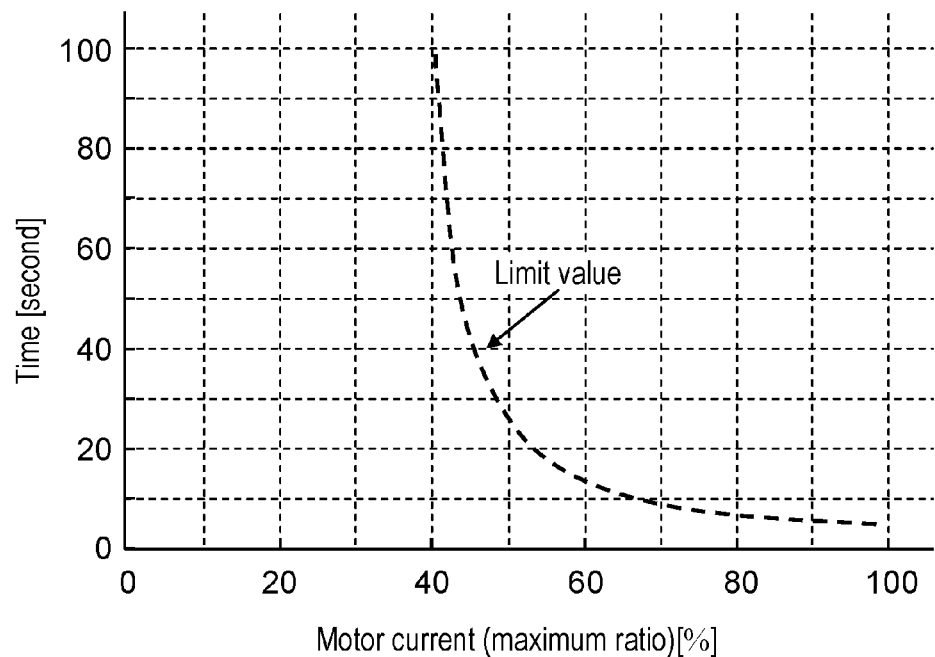
FIG. 7 is a graph showing a motor time-limit characteristic curve (an upper limit of a temperature rise in windings of the motor).
Figure 8:
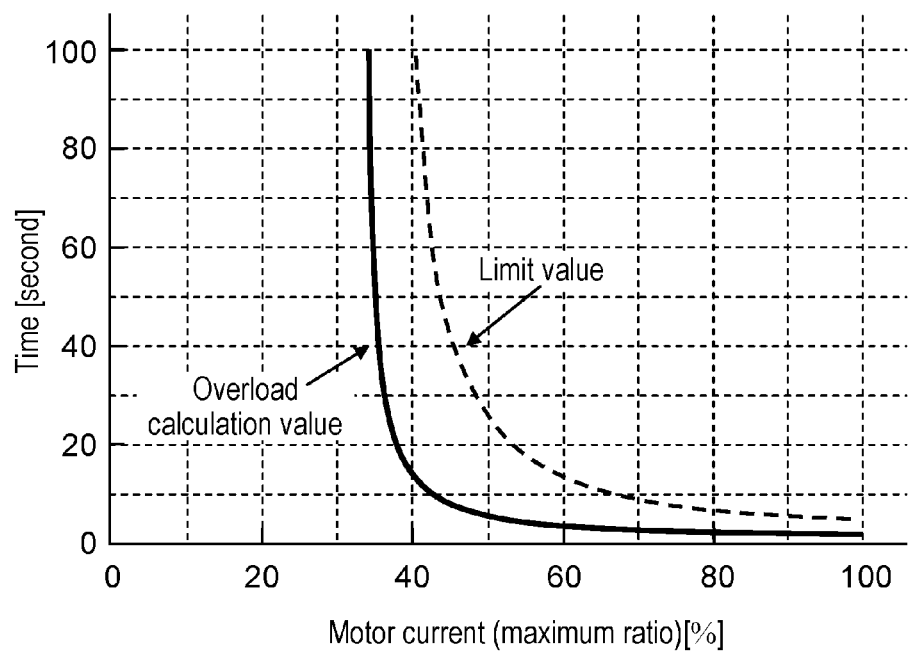
FIG. 8 is a graph showing overload detection threshold characteristics.
Figure 9:
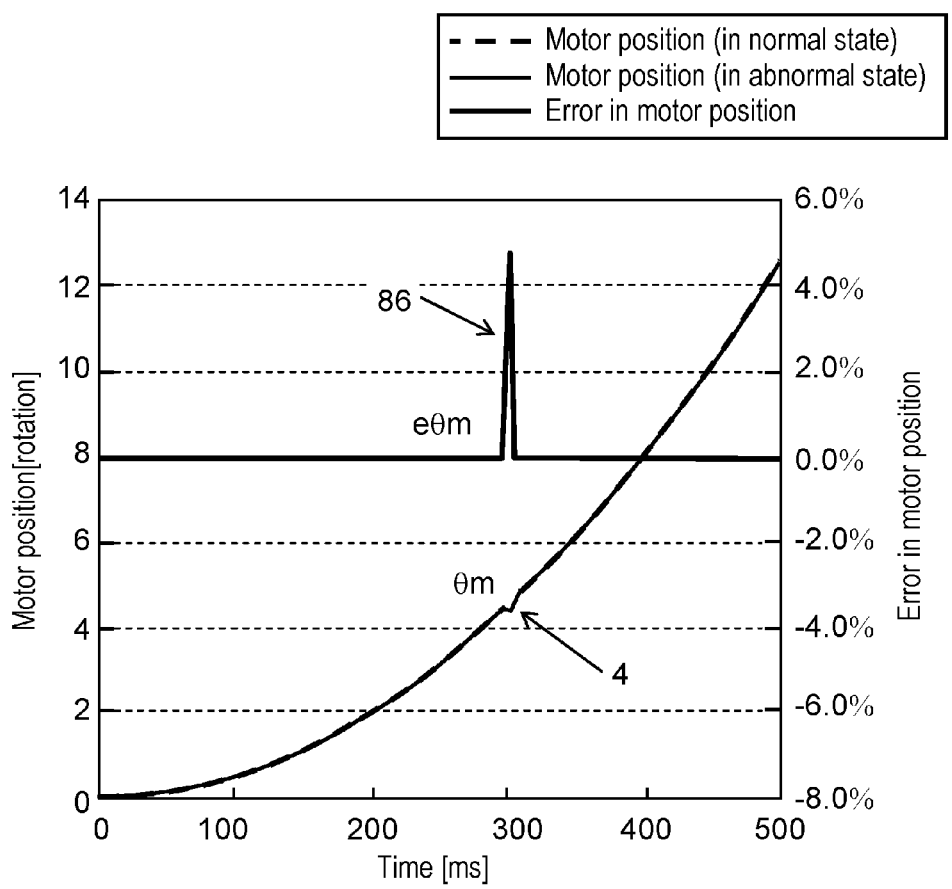
FIG. 9 is a graph showing motor position waveforms at occurrence of abnormality of a motor position detector.
Figure 10:
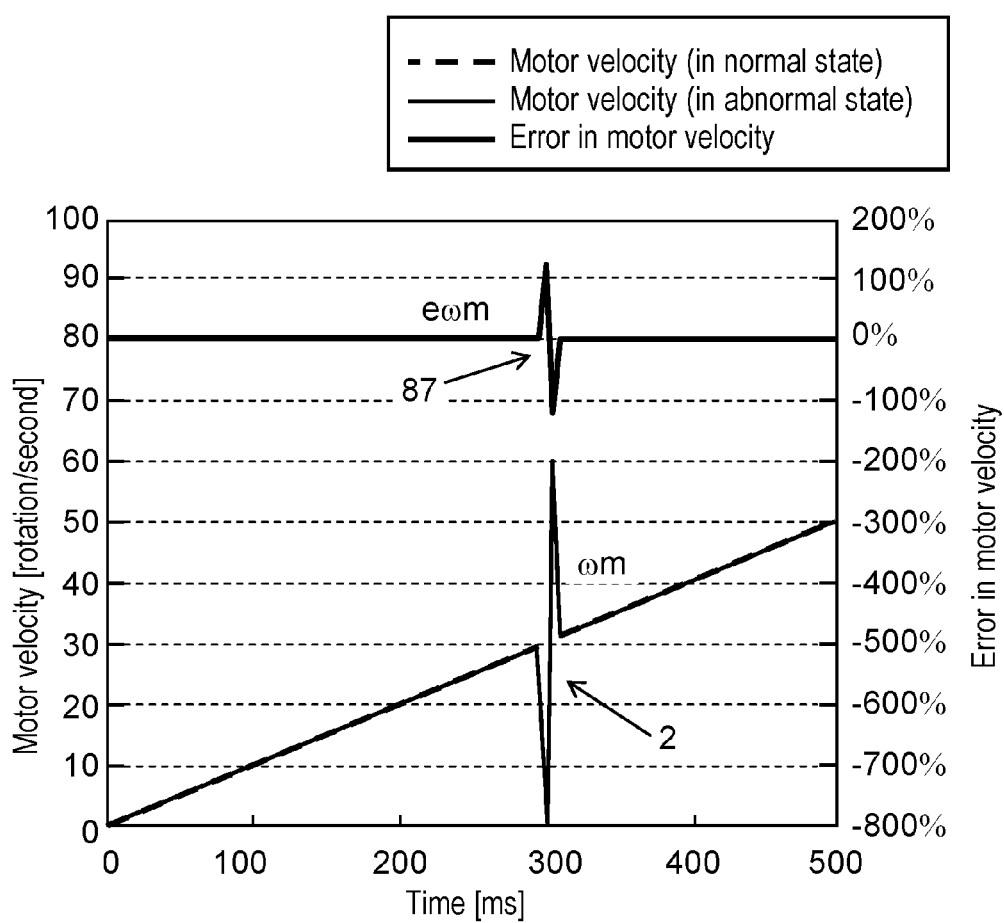
FIG. 10 is a graph showing motor velocity waveforms at occurrence of the abnormality of the motor position detector.
Figure 11:
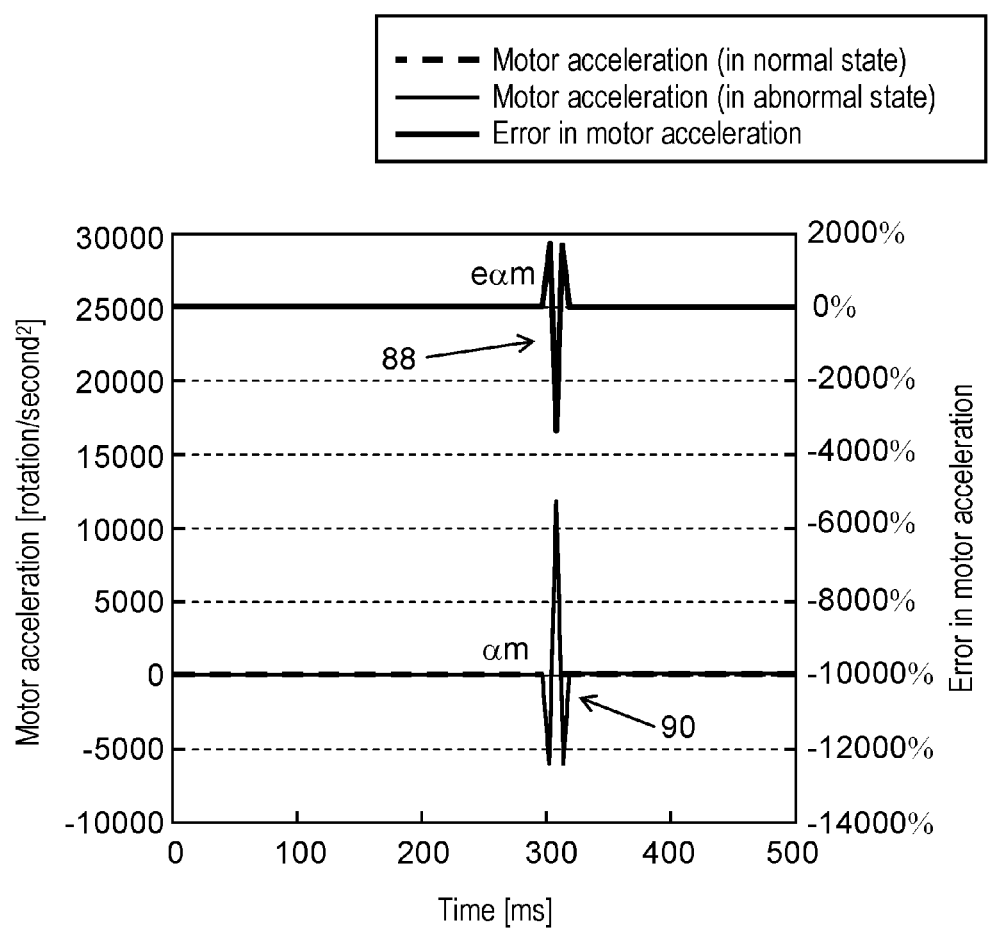
FIG. 11 is a graph showing motor acceleration waveforms at occurrence of the abnormality of the motor position detector.
Figure 12:
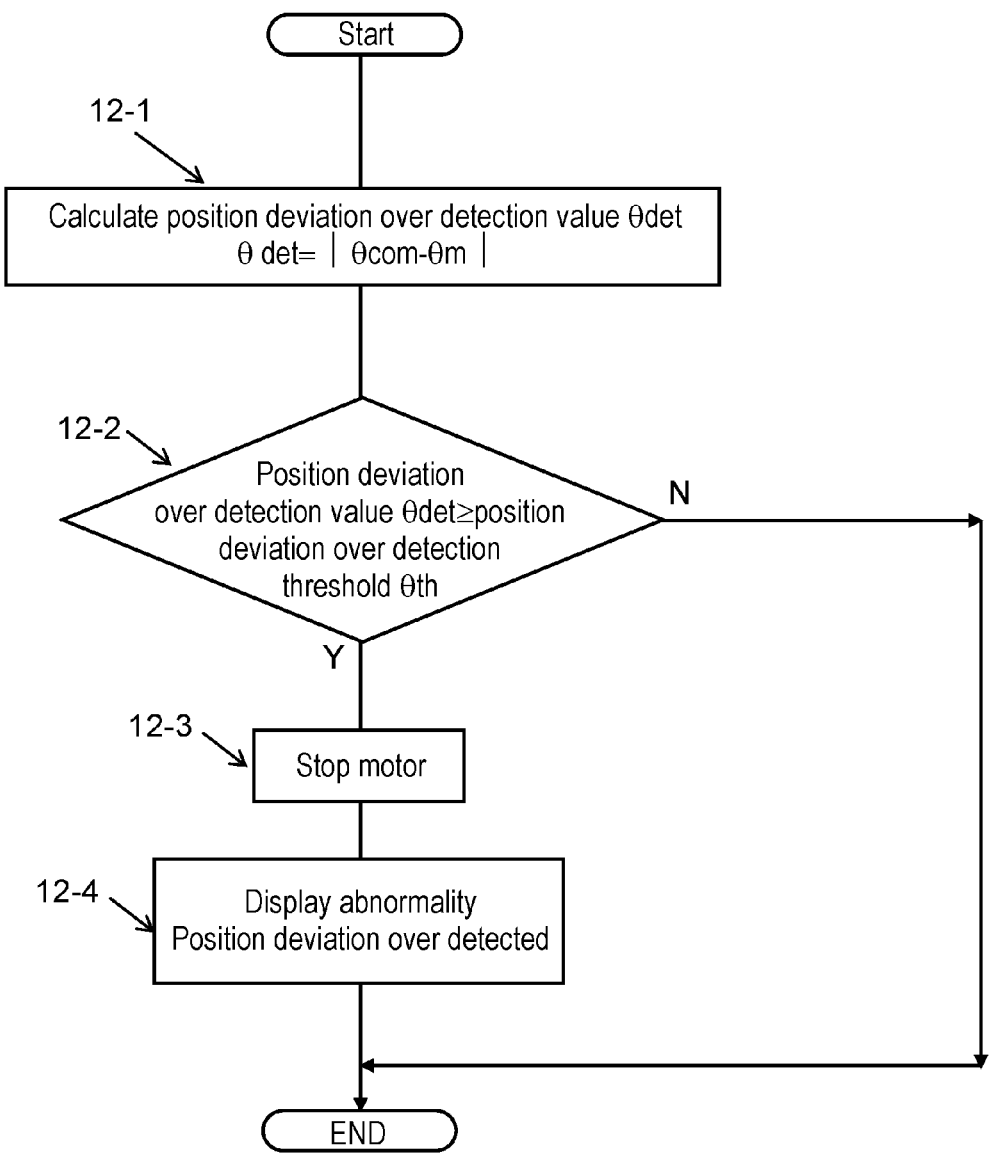
FIG. 12 is a flowchart showing position deviation over detection in accordance with the exemplary embodiments of the present disclosure.
Figure 13:
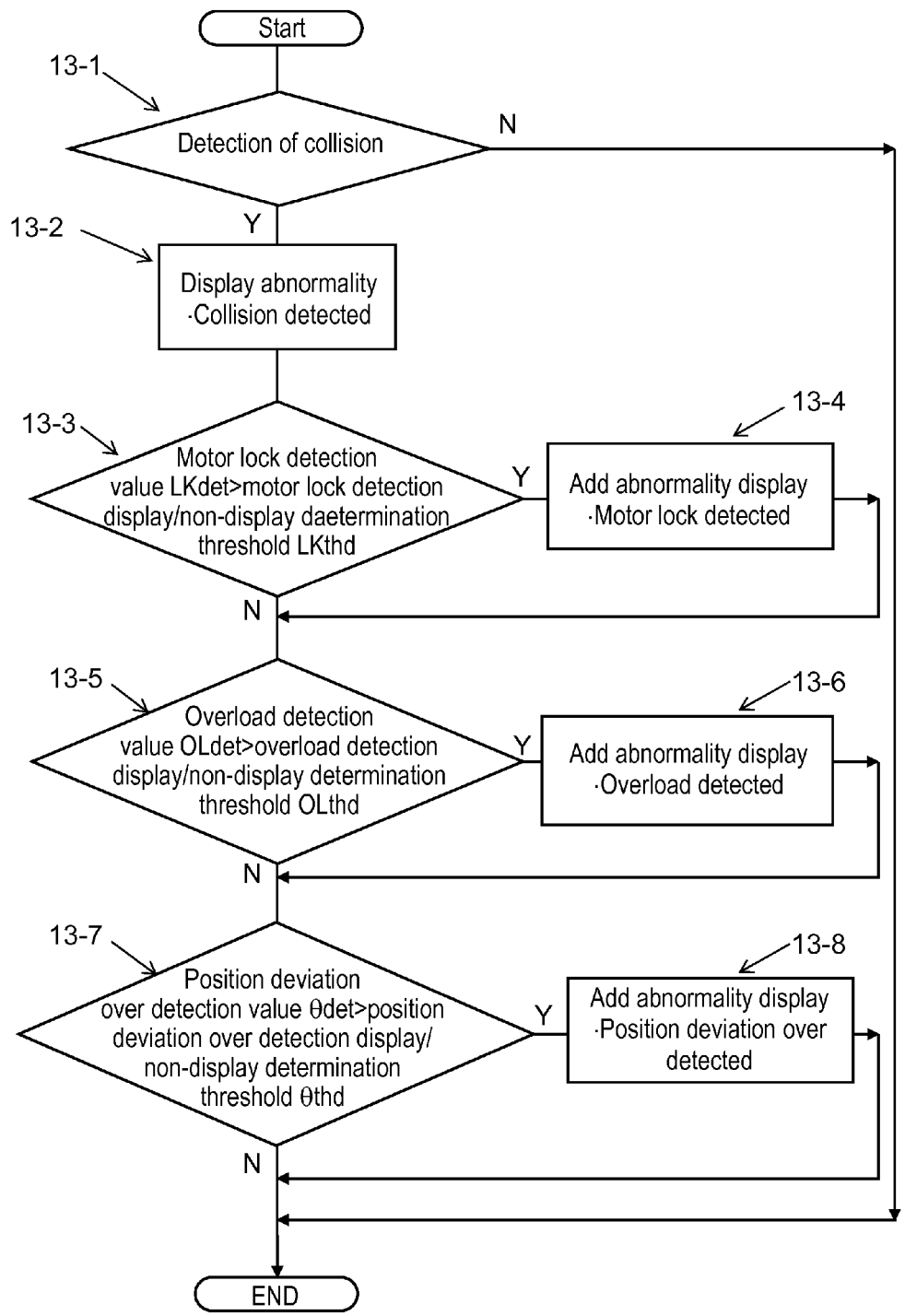
FIG. 13 is a flowchart showing first processing of a plurality of abnormality displays in accordance with a first exemplary embodiment of the present disclosure.

In the first exemplary embodiment, as abnormality display processing at collision detection in Step 2-5 of FIG. 2 described in the background art, first processing of a plurality of abnormality displays shown in the flowchart of FIG. 13 is performed.

In the first processing of the plurality of abnormality displays shown in FIG. 13, when a collision of a robot is detected, the collision detection is shown as an abnormality display. Further, in this processing, from a plurality of abnormality detection items different from collision detection, at least one abnormality display is selected (in Step 13-3 through Step 13-8).

Further, in each of the plurality of abnormality detection steps (Step 13-3, Step 13-5, and Step 13-7) different from collision detection, a display/non-display determination threshold smaller than an abnormality determination threshold is set.

Among the plurality of abnormality detection items, for the item whose abnormality determination value (motor lock detection value LKdet, overload detection value OLdet, or position deviation over detection value $\theta$det) as the corresponding value detected with the robot in operation (e.g. motor generating torque $\tau$m, motor velocity $\omega$m, motor current Im, and motor position $\theta$m) is greater than the display/non-display determination threshold, occurrence of abnormality is shown as an abnormality display (in Step 13-4, Step 13-6, and Step 13-8).

In FIG. 13, in Step 13-1, it is determined whether or not a collision of a robot is detected. When the collision of the robot is detected in Step 13-1, the determination is "Y" and processing proceeds to Step 13-2. In Step 13-2, an abnormality display of "collision detected" is made and processing proceeds to Step 13-3. When the collision of the robot is not detected in Step 13-1, the determination is "N" and thereafter no processing is performed. Thus, the first processing of the plurality of abnormality displays is completed.

In Step 13-3, it is determined whether or not motor lock detection value LKdet is greater than motor lock detection display/non-display determination threshold LKthd. When motor lock detection value LKdet is greater than motor lock detection display/non-display determination threshold LKthd in Step 13-3, the determination is "Y" and processing proceeds to Step 13-4. When motor lock detection value LKdet is not greater than motor lock detection display/non-display determination threshold LKthd in Step 13-3, the determination is "N" and processing proceeds to Step 13-5.

Here, motor lock detection display/non-display determination threshold LKthd is set smaller than motor lock detection time threshold LKth as shown in the following Expression (12):

$$0 < LKthd < LKth \quad (12)$$

In Step 13-4, "motor lock detected" is added as an abnormality display and displayed, and processing proceeds to Step 13-5.

In Step 13-5, it is determined whether or not overload detection value OLdet is greater than overload detection display/non-display determination threshold OLthd. When overload detection value OLdet is greater than overload detection display/non-display determination threshold OLthd in Step 13-5, the determination is "Y" and processing proceeds to Step 13-6. When overload detection value OLdet is not greater than overload detection display/non-display determination threshold OLthd in Step 13-5, the determination is "N" and processing proceeds to Step 13-7.

Here, overload detection display/non-display determination threshold OLthd is set smaller than overload threshold OLth as shown in the following Expression (13):

$$0 < OLthd < OLth \tag{13}$$

In Step 13-6, "overload detected" is added as an abnormality display and displayed, and processing proceeds to Step 13-7.

In Step 13-7, it is determined whether or not position deviation over detection value θdet is greater than position deviation over detection display/non-display determination threshold θthd. When position deviation over detection value θdet is greater than position deviation over detection display/non-display determination threshold θthd in Step 13-7, the determination is "Y" and processing proceeds to Step 13-8. When position deviation over detection value θdet is not greater than position deviation over detection display/non-display determination threshold θthd in Step 13-7, the determination is "N" and the first processing of the plurality of abnormality displays is completed.

Here, position deviation over detection display/non-display determination threshold θthd is set smaller than position deviation over detection threshold θth as shown in the following Expression (14):

$$0 < \theta thd < \theta th \tag{14}$$

In Step 13-8, "position deviation over detected" is added as an abnormality display and displayed, and the first processing of the plurality of abnormality displays is completed.

In this manner, at occurrence of collision detection, a plurality of abnormality displays different from collision detection is made. This can offer information useful for the user to understand the situations when a collision is erroneously detected.

For instance, suppose that even though a robot has not actually collided, the robot is stopped by abnormality and the abnormality displays at that time include "motor lock detected" in addition to "collision detected". This case is predicted to be a phenomenon that the motor hardly operates due to abnormality of the motor brake or the decelerator. When "overload detected" is displayed in addition to "collision detected", it is predicted that abnormality of the motor bearing or the decelerator has caused the motor to operate with a large friction. When "position deviation over detected" is displayed in addition to "collision detected", it is predicted that abnormality has occurred in the motor position detector.

Second Exemplary Embodiment

Figure 14:
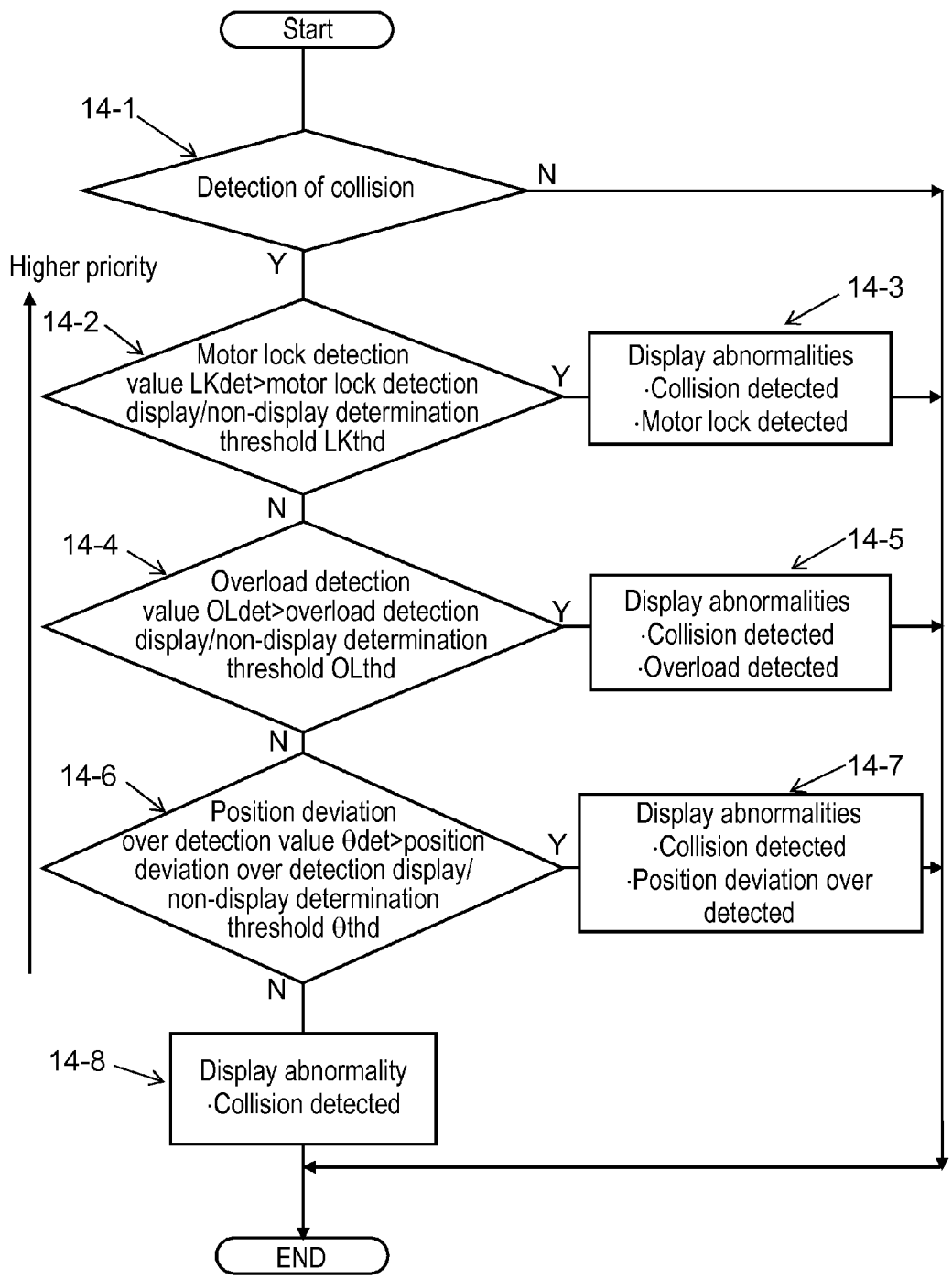
FIG. 14 is a flowchart showing second processing of a plurality of abnormality displays in accordance with a second exemplary embodiment of the present disclosure.

In the second exemplary embodiment, as abnormality display processing at collision detection in Step 2-5 of FIG. 2, second processing of a plurality of abnormality displays shown in the flowchart of FIG. 14 is performed.

In the second processing of the plurality of abnormality displays shown in FIG. 14, priority is given to the plurality of abnormality detection items. In order from the item whose priority is the highest, the following determination is made. That is, whether or not the abnormality determination value (motor lock detection value LKdet, overload detection value OLdet, or position deviation over detection value θdet) as the corresponding value detected with the robot in operation (e.g. motor torque τm, motor velocity ωm, motor current Im, and motor position θm) is greater than a display/non-display determination threshold. Only for the abnormality detection item whose abnormality determination value is greater than the display/non-display determination threshold, an abnormality display is made. For the abnormality detection items whose priority is lower than the abnormality detection item for which an abnormality display has been made, neither determination of whether or not the abnormality determination value is greater than the display/non-display determination threshold nor the abnormality display is made. (Processing proceeds to one of Step 14-3, Step 14-5, and Step 14-7 so that the processing is completed).

In FIG. 14, the plurality of abnormality detection items has higher priority from "motor lock detection", "overload detection", and "position deviation over detection" in this order.

In FIG. 14, in Step 14-1, it is determined whether or not a collision of a robot is detected. When the collision of the robot is detected in Step 14-1, the determination is "Y" and processing proceeds to Step 14-2. When the collision of the robot is not detected in Step 14-1, the determination is "N" and thereafter no processing is performed. Thus, the second processing of the plurality of abnormality displays is completed.

In Step 14-2, the determination is made on motor lock detection, which has the highest priority. It is determined whether or not motor lock detection value LKdet is greater than motor lock detection display/non-display determination threshold LKthd. When motor lock detection value LKdet is greater than motor lock detection display/non-display determination threshold LKthd in Step 14-2, the determination is "Y" and processing proceeds to Step 14-3. When motor lock detection value LKdet is not greater than motor lock detection display/non-display determination threshold LKthd in Step 14-2, the determination is "N" and processing proceeds to Step 14-4.

In Step 14-3, "collision detected" and "motor lock detected" are shown as abnormality displays and the second processing of the plurality of abnormality displays is completed.

In Step 14-4, the determination is made on overload detection, which has the second highest priority. It is determined whether or not overload detection value OLdet is greater than overload detection display/non-display determination threshold OLthd. When overload detection value OLdet is greater than overload detection display/non-display determination threshold OLthd in Step 14-4, the determination is "Y" and processing proceeds to Step 14-5. When overload detection value OLdet is not greater than overload detection display/non-display determination threshold OLthd in Step 14-4, the determination is "N" and processing proceeds to Step 14-6.

In Step 14-5, "collision detected" and "overload detected" are shown as abnormality displays and the second processing of the plurality of abnormality displays is completed.

In Step 14-6, the determination is made on position deviation over detection, which has the lowest priority. It is determined whether or not position deviation over detection value θdet is greater than position deviation over detection display/non-display determination threshold θthd. When position deviation over detection value θdet is greater than position deviation over detection display/non-display determination threshold θthd in Step 14-6, the determination is "Y" and processing proceeds to Step 14-7. When position deviation over detection value θdet is not greater than position deviation over detection display/non-display determination threshold θthd in Step 14-6, the determination is "N" and processing proceeds to Step 14-8.

In Step 14-7, "collision detected" and "position deviation over detected" are shown as abnormality displays and the second processing of the plurality of abnormality displays is completed.

In Step 14-8, only "collision detected" is shown as an abnormality display and the second processing of the plurality of abnormality displays is completed.

Third Exemplary Embodiment

Figure 15:
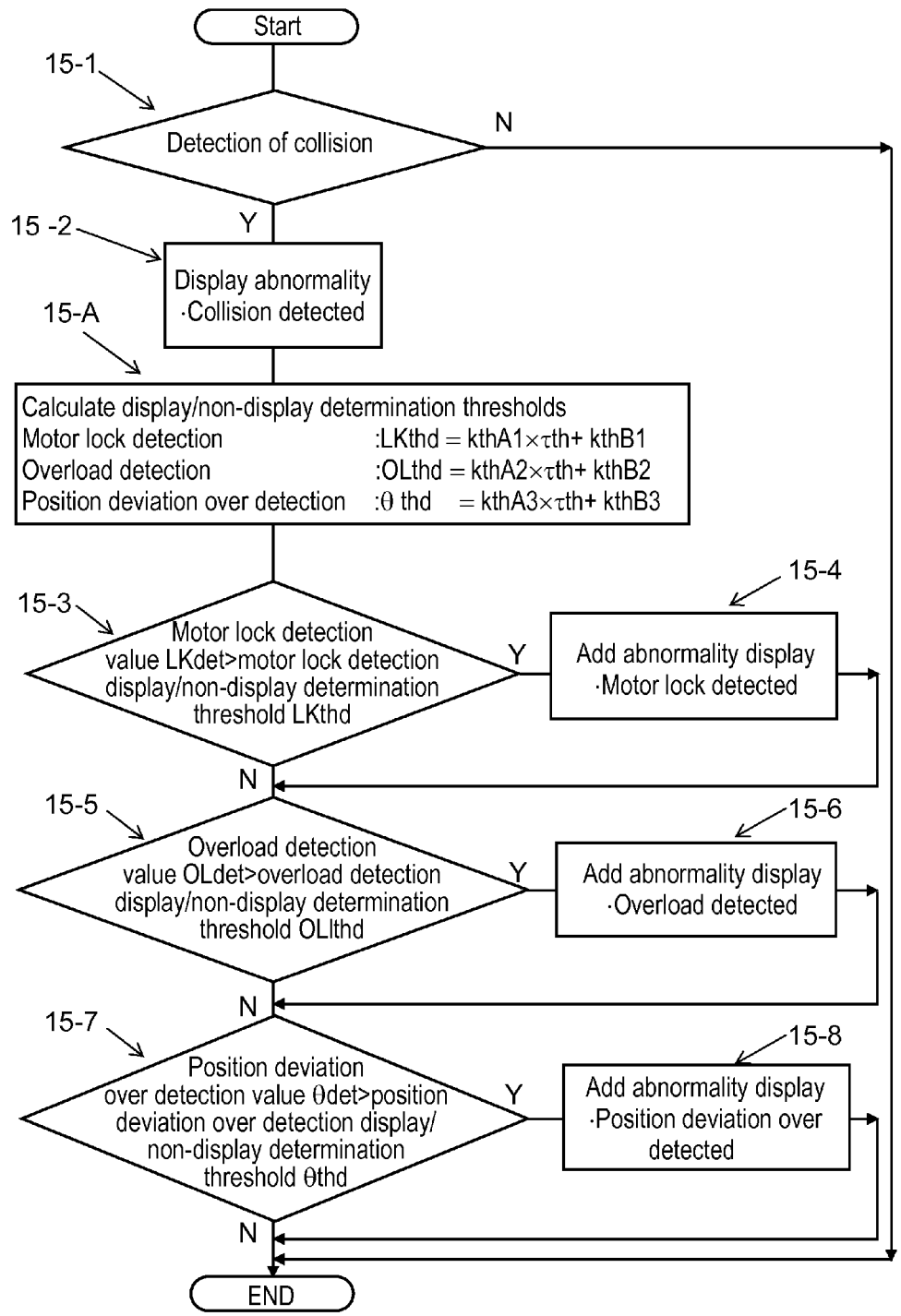
FIG. 15 is a flowchart showing third processing of a plurality of abnormality displays in accordance with a third exemplary embodiment of the present disclosure.

In the third exemplary embodiment, as abnormality display processing at collision detection in Step 2-5 of FIG. 2, third processing of a plurality of abnormality displays shown in the flowchart of FIG. 15 is performed.

In the third processing of the plurality of abnormality displays shown in FIG. 15, the following processing is added to the first processing of the plurality of abnormality displays of FIG. 13 in the first exemplary embodiment. That is, based on a collision detection threshold for each of the predetermined abnormality detection items, a display/non-display determination threshold for each abnormality detection item is determined.

In FIG. 15, in Step 15-1, it is determined whether or not a collision of a robot is detected. When the collision of the robot is detected in Step 15-1, the determination is "Y" and processing proceeds to Step 15-2, where an abnormality display of "collision detected" is made. Further, processing proceeds to Step 15-A. When the collision of the robot is not detected in Step 15-1, the determination is "N" and thereafter no processing is performed. Thus, the third processing of the plurality of abnormality displays is completed.

Step 15-A is processing added in order to determine a display/non-display determination threshold for each abnormality detection item based on the predetermined collision detection threshold. In Step 15-A, based on collision detection threshold τth, motor lock detection display/non-display determination threshold LKthd, overload detection display/non-display determination threshold OLthd, and position deviation over detection display/non-display determination threshold θthd are calculated, as shown in the following Equations (15-1) through (15-3):

$$LKthd = kthA1 \times \tau th + kthB1 \quad (15\text{-}1)$$

$$OLthd = kthA2 \times \tau th + kthB2 \quad (15\text{-}2), \text{ and}$$

$$\theta thd = kthA3 \times \tau th + kthB3 \quad (15\text{-}3).$$

In the Equations, each of kthA1, kthA2, and kthA3 is a proportionality coefficient of collision detection threshold (τth), and each of kthB1, kthB2, and kthB3 is a summing coefficient.

Each abnormality detection display/non-display determination threshold is obtained based on collision detection threshold τth as described above for the following reason. That is, higher collision detection threshold τth (i.e. lower collision detection sensitivity) lowers the possibility of erroneous detection of a collision. If a collision is not erroneously detected, display of the other types of abnormality can complicate the judgment of the situations at occurrence of collision detection. Thus, as collision detection threshold τth is increased, the abnormality detection display/non-display determination threshold is increased. This prevents display of a plurality of types of abnormality.

Motor lock detection display/non-display determination threshold LKthd, overload detection display/non-display determination threshold OLthd, and position deviation over detection display/non-display determination threshold θthd calculated in Step 15-A are used for the determination in Step 15-3, Step 15-5, and Step 15-7.

The processing in Step 15-3 and thereafter is the same as the processing in Step 13-3 and thereafter of FIG. 13 in the first exemplary embodiment.

Fourth Exemplary Embodiment

Figure 16:
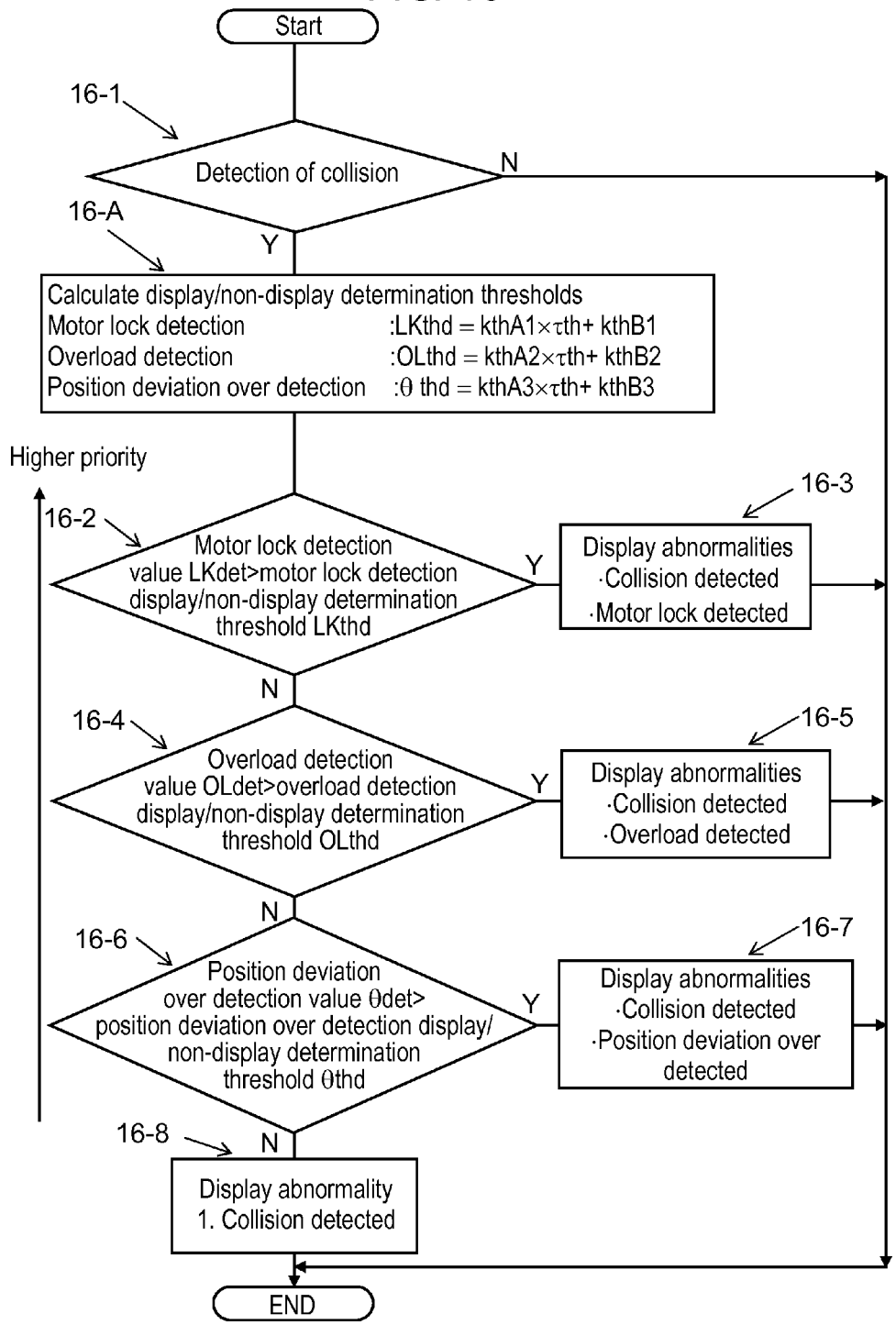
FIG. 16 is a flowchart showing fourth processing of a plurality of abnormality displays in accordance with a fourth exemplary embodiment of the present disclosure.

In the fourth exemplary embodiment, as abnormality display processing at collision detection in Step 2-5 of FIG. 2, fourth processing of a plurality of abnormality displays shown in the flowchart of FIG. 16 is performed.

In the fourth processing of the plurality of abnormality displays shown in FIG. 16, the following processing (Step 16-A) is added to the second processing of the plurality of abnormality displays of FIG. 14 in the second exemplary embodiment. That is, based on a predetermined collision detection threshold, a display/non-display determination threshold for each abnormality detection item is determined.

The processing in Step 16-A is the same as the processing in Step 15-A of FIG. 15 in the third exemplary embodiment. The processing in Step 16-3 and thereafter is the same as the processing in Step 14-3 and thereafter of FIG. 14 in the second exemplary embodiment.

Fifth Exemplary Embodiment

Figure 17:
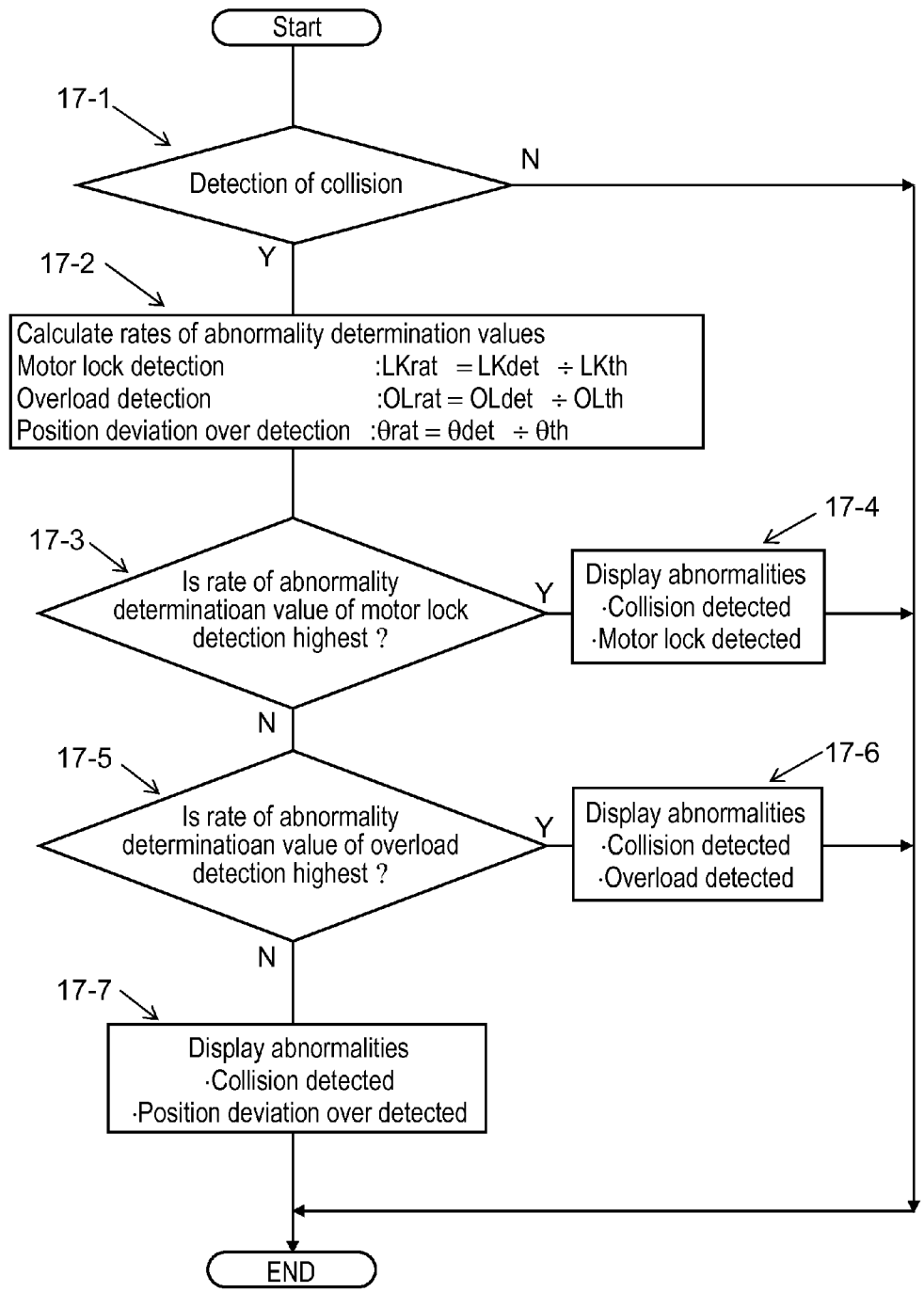
FIG. 17 is a flowchart showing fifth processing of a plurality of abnormality displays in accordance with a fifth exemplary embodiment of the present disclosure.

In the fifth exemplary embodiment, as abnormality display processing at collision detection in Step 2-5 of FIG. 2, fifth processing of a plurality of abnormality displays shown in the flowchart of FIG. 17 is performed.

In the fifth processing of the plurality of abnormality displays of FIG. 17, for each abnormality detection item, the following rate is obtained. That is, the rate of an abnormality determination value (motor lock detection value LKdet, overload detection value OLdet, or position deviation over detection value θdet) as the corresponding value detected with the robot in operation (e.g. motor torque τm, motor velocity ωm, motor current Im, and motor position θm) with respect to the corresponding abnormality determination threshold. Further, together with collision detection, an abnormality display is made only for the abnormality detection item whose rate of the abnormality determination value is the highest.

In FIG. 17, in Step 17-1, it is determined whether or not a collision of a robot is detected. When the collision of the robot is detected in Step 17-1, the determination is "Y" and processing proceeds to Step 17-2. When the collision of the robot is not detected in Step 17-1, the determination is "N" and the fifth processing of the plurality of abnormality displays is completed.

In Step 17-2, the rate of each abnormality determination value with respect to the corresponding abnormality determination threshold is calculated. In Step 17-2, rate of motor lock detection abnormality determination value LKrat, rate of overload detection abnormality determination value OLrat, and rate of position deviation over detection abnormality determination value θrat are calculated by the following Equations (16-1) through (16-3):

$$LKrat = LKdet \div LKth \quad (16\text{-}1)$$

$$OLrat = OLdet \div OLth \quad (16\text{-}2), \text{ and}$$

$$θrat = θdet \div θth \quad (16\text{-}3).$$

In the Equations (16-1) through (16-3), LKdet is a motor lock detection value, LKth is a motor lock detection time threshold, OLdet is an overload detection value, OLth is an overload detection threshold, θdet is a position deviation over detection value, and θth is a position deviation over detection threshold.

In Step 17-3, it is determined whether or not rate of motor lock detection abnormality determination value LKrat is the highest of the rates of abnormality determination values obtained in Step 17-2. When rate of motor lock detection abnormality determination value LKrat is the highest in Step 17-3, the determination is "Y" and processing proceeds to Step 17-4. When rate of motor lock detection abnormality determination value LKrat is not the highest in Step 17-3, the determination is "N" and processing proceeds to Step 17-5.

In Step 17-4, "collision detected" and "motor lock detected" are shown as abnormality displays. Thus, the fifth processing of the plurality of abnormality displays is completed.

In Step 17-5, it is determined whether or not rate of overload detection abnormality determination value OLrat is the highest of the rates of abnormality determination values obtained in Step 17-2. When rate of overload detection abnormality determination value OLrat is the highest in Step 17-5, the determination is "Y" and processing proceeds to Step 17-6. When rate of overload detection abnormality determination value OLrat is not the highest in Step 17-5, the determination is "N" and processing proceeds to Step 17-7.

In Step 17-6, "collision detected" and "overload detected" are shown as abnormality displays. Thus, the fifth processing of the plurality of abnormality displays is completed.

In Step 17-7, "collision detected" and "position deviation over detected" are shown as abnormality displays. Thus, the fifth processing of the plurality of abnormality displays is completed.

Only the item whose rate of the abnormality determination value is the highest is displayed for the following reason. When no actual collision is detected, the abnormality whose rate of the abnormality determination value is the highest occurs with the highest possibility.

Sixth Exemplary Embodiment

Figure 18:
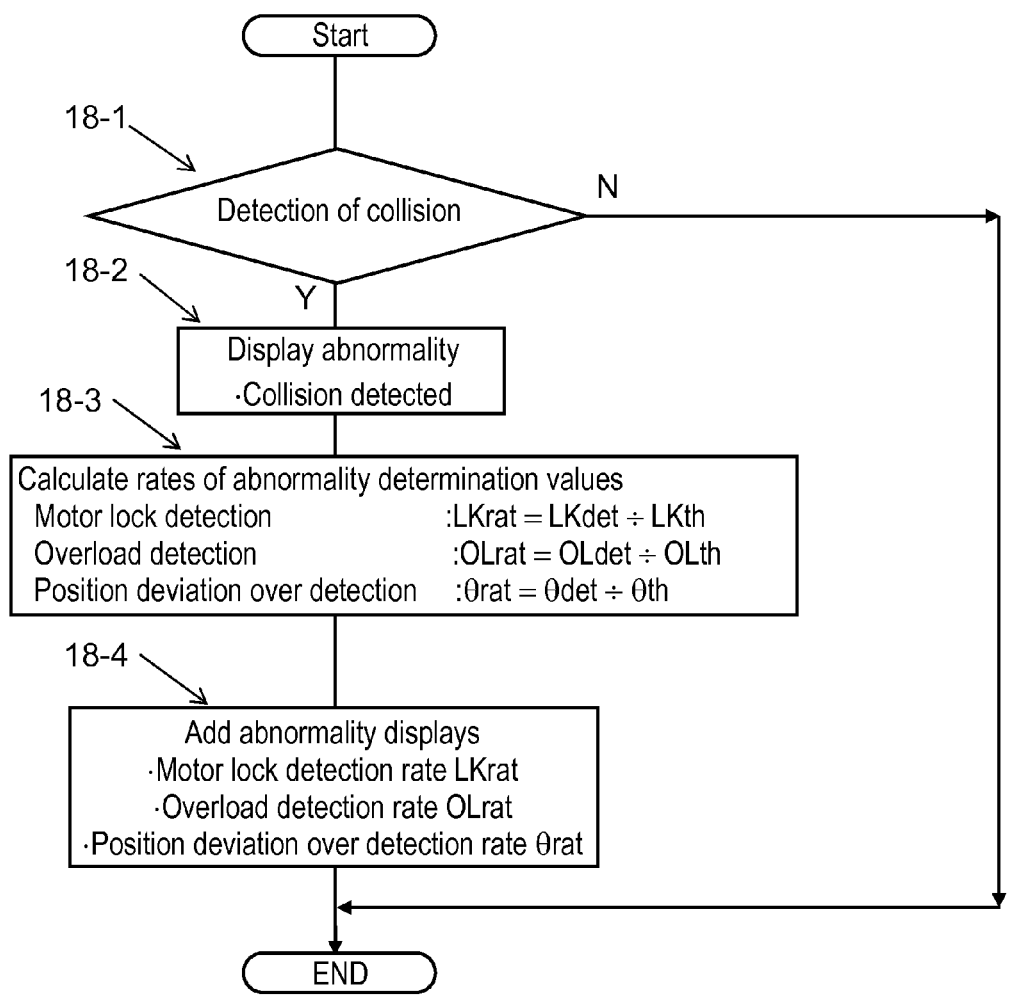
FIG. 18 is a flowchart showing sixth processing of a plurality of abnormality displays in accordance with a sixth exemplary embodiment of the present disclosure.

In the sixth exemplary embodiment, as abnormality display processing at collision detection in Step 2-5 of FIG. 2, sixth processing of a plurality of abnormality displays shown in the flowchart of FIG. 18 is performed.

In FIG. 18, in Step 18-1, it is determined whether or not a collision of a robot is detected. When the collision of the robot is detected in Step 18-1, the determination is "Y" and processing proceeds to Step 18-2, where an abnormality display of "collision detected" is made. Further, processing proceeds to Step 18-3. When the collision of the robot is not detected in Step 18-1, the determination is "N" and thereafter no processing is performed. Thus, the sixth processing of the plurality of abnormality displays is completed.

In Step 18-3, the rate of each abnormality determination value with respect to the corresponding abnormality determination threshold is calculated. Rate of motor lock detection abnormality determination value LKrat, rate of overload detection abnormality determination value OLrat, and rate of position deviation over detection abnormality determination value θrat are calculated by Equations (16-1) through (16-3), which have been described in the fifth exemplary embodiment. Thereafter, processing proceeds to Step 18-4.

In Step 18-4, as abnormality displays, "motor lock detection rate LKrat", "overload detection rate OLrat", and "position deviation over detection rate θrat" are added. Thus, the sixth processing of the plurality of abnormality displays is completed. As each rate of the abnormality determination value, an actually calculated numerical value is displayed.

At occurrence of collision detection, the other rates of the abnormality determination values are displayed. Thereby, if no collision is detected, the user can be informed about abnormality detection items with degrees of possibility that abnormality occurs.

Seventh Exemplary Embodiment

Figure 19:
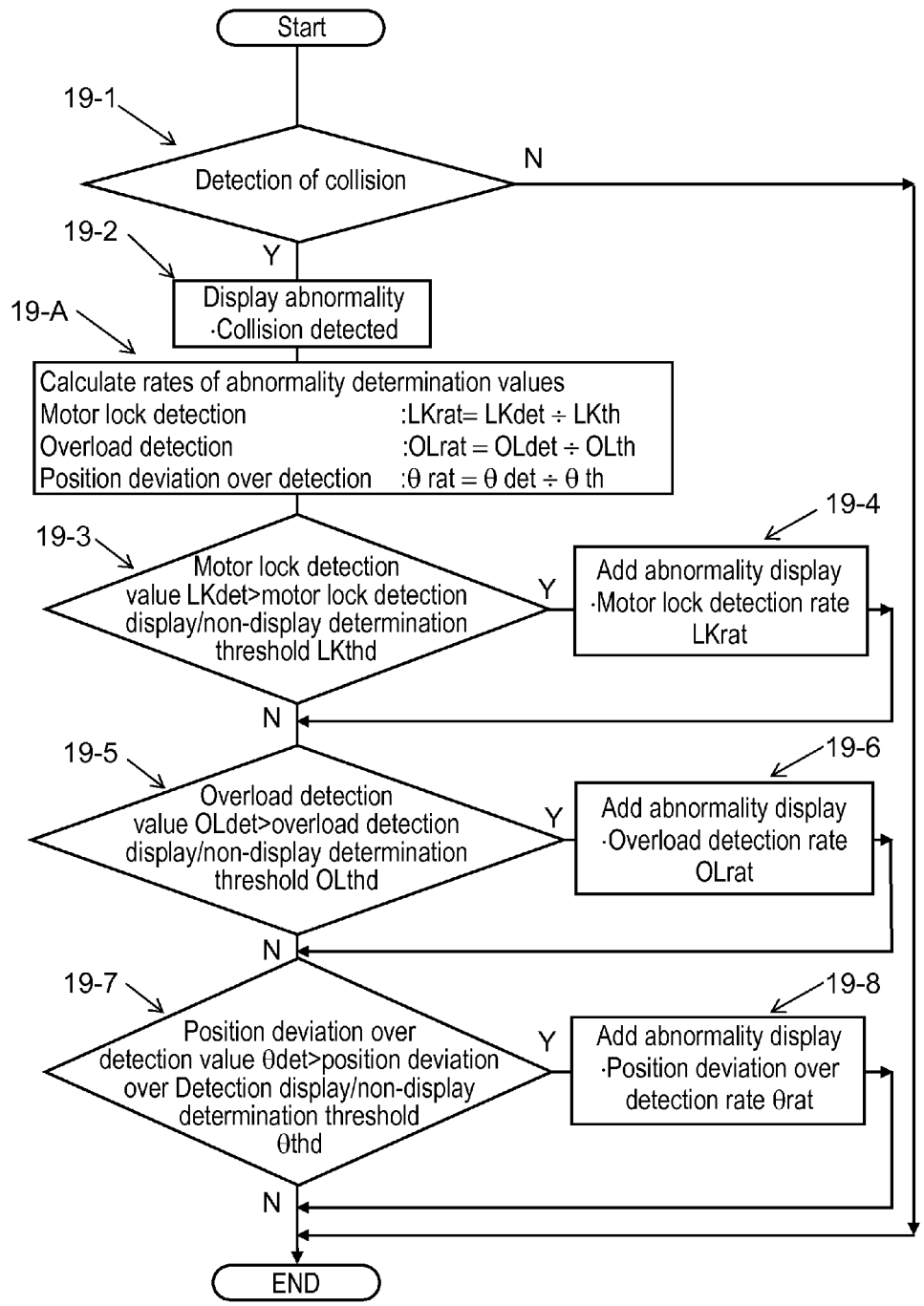
FIG. 19 is a flowchart showing seventh processing of a plurality of abnormality displays in accordance with a seventh exemplary embodiment of the present disclosure.
Figure 20:
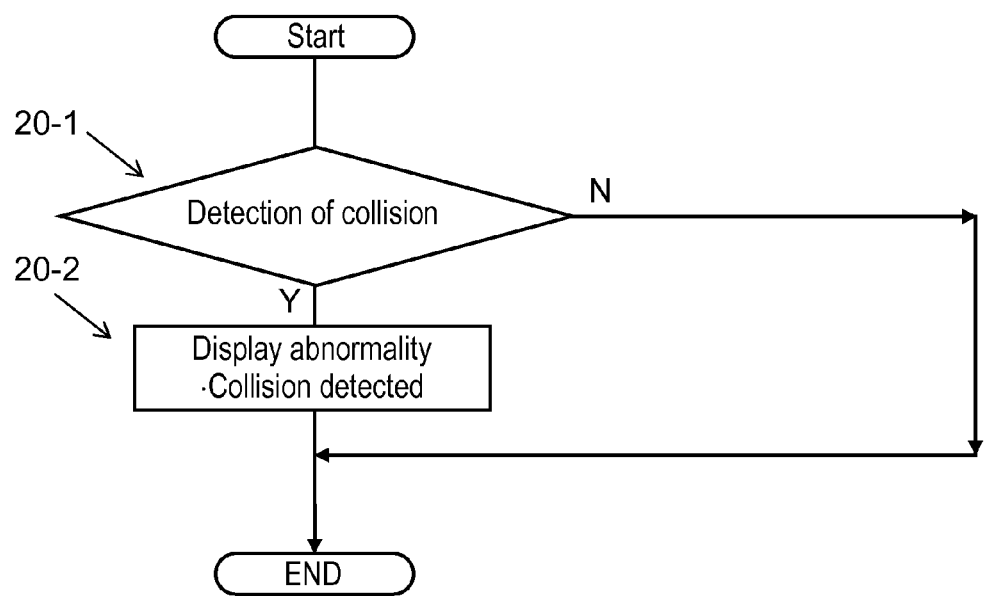
FIG. 20 is a flowchart showing conventional processing of a single abnormality display.

In the seventh exemplary embodiment, as abnormality display processing at collision detection in Step 2-5 of FIG. 2, seventh processing of a plurality of abnormality displays shown in the flowchart of FIG. 19 is performed.

In the seventh processing of the plurality of abnormality displays shown in FIG. 19, the following processing is added to the first processing of the plurality of abnormality displays of FIG. 13 in the first exemplary embodiment. That is, for each abnormality detection item, the rate of an abnormality determination value with respect to the corresponding abnormality determination threshold is obtained. In the first exemplary embodiment, when a collision of a robot is detected, each abnormality detection item is displayed together with display of collision detection. In this exemplary embodiment, the processing of displaying each abnormality detection item is replaced with the processing of displaying the rate of an abnormality determination value with respect to the corresponding abnormality determination threshold for each abnormality detection item.

In FIG. 19, in Step 19-1, it is determined whether or not a collision of the robot is detected. When the collision of the robot is detected in Step 19-1, the determination is "Y" and processing proceeds to Step 19-2, where an abnormality display of "collision detected" is made. Further, processing proceeds to Step 19-A. When the collision of the robot is not detected in Step 19-1, the determination is "N" and thereafter no processing is performed. Thus, the seventh processing of the plurality of abnormality displays is completed.

In Step 19-A, the rate of each abnormality determination value with respect to the corresponding abnormality determination threshold is calculated. Rate of motor lock detection abnormality determination value LKrat, rate of overload detection abnormality determination value OLrat, and rate of position deviation over detection abnormality determination value θrat are calculated by Equations (16-1) through (16-3), which have already been described in the fifth exemplary embodiment.

In Step 19-3, it is determined whether or not motor lock detection value LKdet is greater than motor lock detection display/non-display determination threshold LKthd. When motor lock detection value LKdet is greater than motor lock detection display/non-display determination threshold LKthd in Step 19-3, the determination is "Y" and processing proceeds to Step 19-4. When motor lock detection value LKdet is not greater than motor lock detection display/non-display determination threshold LKthd in Step 19-3, the determination is "N" and processing proceeds to Step 19-5.

In Step 19-4, "motor lock detection rate LKrat" is added as an abnormality display and displayed, and processing proceeds to Step 19-5. As motor lock detection rate LKrat, an actually calculated numerical value is displayed.

In Step 19-5, it is determined whether or not overload detection value OLdet is greater than overload detection display/non-display determination threshold OLthd. When overload detection value OLdet is greater than overload detection display/non-display determination threshold OLthd in Step 19-5, the determination is "Y" and processing proceeds to Step 19-6. When overload detection value OLdet is not greater than overload detection display/non-display determination threshold OLthd in Step 19-5, the determination is "N" and processing proceeds to Step 19-7.

In Step 19-6, "overload detection rate OLrat" is added as an abnormality display and displayed, and processing proceeds to Step 19-7. As overload detection rate OLrat, an actually calculated numerical value is displayed.

In Step 19-7, it is determined whether or not position deviation over detection value θdet is greater than position deviation over detection display/non-display determination threshold θthd. When position deviation over detection value θdet is greater than position deviation over detection display/non-display determination threshold θthd in Step 19-7, the determination is "Y" and processing proceeds to Step 19-8. When position deviation over detection value Met is not greater than position deviation over detection display/non-display determination threshold θthd in Step 19-7, the determination is "N" and the seventh processing of the plurality of abnormality displays is completed.

In Step 19-8, "position deviation over detection rate θrat" is added as an abnormality display and displayed, and the seventh processing of the plurality of abnormality displays is completed. As position deviation over detection rate θrat, an actually calculated numerical value is displayed.

At occurrence of collision detection, the rate of the abnormality determination value only for an abnormality whose detection value is greater than the detection display/non-display determination threshold is displayed. Thereby, if no collision is detected, a narrowed-down list of abnormality detection items can be displayed with degrees of possibility that abnormality occurs.

In a method for displaying abnormality of a robot of the present disclosure, when a collision of the robot is detected and collision detection is shown as an abnormality display, at least one abnormality display is selected from a plurality of abnormality detection items different from the collision detection. This processing can offer information useful for the user to understand the situations at occurrence of erroneous detection of a collision. Thus, the present disclosure is industrially useful.

What is claimed is:

1. A method for displaying an abnormality of a robot, the method comprising:
   detecting, using a motor position detector, a motor position of each of a plurality of shafts of the robot, and obtaining operation values for the robot in operation using the detected motor position of each of the plurality of shafts of the robot;
   detecting, in a sensor-less manner, a first abnormality of the robot using the operation values, the first abnormality being a collision of the robot, and displaying the first abnormality; and
   after the detecting the first abnormality, (i) detecting a second abnormality of the robot using the operation values and (ii) displaying the second abnormality of the robot when a calculation using the operation values is greater than a display determination threshold corresponding to the second abnormality, the second abnormality being different from the first abnormality,
   wherein the display determination threshold corresponding to the second abnormality is less than an abnormality determination threshold corresponding to the second abnormality, the abnormality determination threshold corresponding to the second abnormality being used to determine an occurrence of the second abnormality.

2. The method for displaying the abnormality of the robot of claim 1, wherein the second abnormality is from among a plurality of abnormalities detected using the operation values.

3. The method for displaying the abnormality of the robot of claim 1, wherein the display determination threshold corresponding to the second abnormality is determined based on a predetermined collision detection threshold.

4. The method for displaying the abnormality of the robot of claim 1, wherein the second abnormality is one of detection of a lock of a motor for driving the robot, overload detection of the motor, and position deviation detection of the robot.

5. A method for displaying an abnormality of a robot, the method comprising:
   detecting, using a motor position detector, a motor position of each of a plurality of shafts of the robot, and obtaining operation values for the robot in operation using the detected motor position of each of the plurality of shafts of the robot;
   detecting, in a sensor-less manner, a first abnormality of the robot using the operation values, the first abnormality being a collision of the robot, and displaying the first abnormality; and
   after the detecting the first abnormality, (i) detecting a second abnormality of the robot using the operation values and (ii) displaying the second abnormality of the robot when a calculation using the operation values is greater than a display determination threshold corresponding to the second abnormality, the second abnormality being different from the first abnormality,
   wherein the second abnormality is from among a plurality of abnormalities detected using the operation values,
   wherein each of the plurality of abnormalities has a priority, and
   wherein the method further comprises:
      for each of the plurality of abnormalities in order of priority until the second abnormality is displayed, (i) determining whether a calculation using the operation values is greater than a display determination threshold corresponding to the abnormality, the display determination threshold corresponding to the abnormality being less than an abnormality determination threshold corresponding to the abnormality, the abnormality determination threshold corresponding to the abnormality being used to determine an occurrence of the abnormality, and (ii) displaying, as the second abnormality, the abnormality when the calculation using the operation values is greater than the display determination threshold corresponding to the abnormality.

6. A method for displaying an abnormality of a robot, the method comprising:

detecting, using a motor position detector, a motor position of each of a plurality of shafts of the robot, and obtaining operation values for the robot in operation using the detected motor position of each of the plurality of shafts of the robot;

detecting, in a sensor-less manner, a first abnormality of the robot using the operation values, the first abnormality being a collision of the robot, and displaying the first abnormality; and after the detecting the first abnormality, (i) detecting a second abnormality of the robot using the operation values and (ii) displaying the second abnormality of the robot when a calculation using the operation values is greater than a display determination threshold corresponding to the second abnormality, the second abnormality being different from the first abnormality, wherein the second abnormality is from among a plurality of abnormalities detected using the operation values, and wherein the method further comprises:
  determining, for each of the plurality of abnormalities, a rate of abnormality determination using the operation values and an abnormality determination threshold corresponding to the abnormality, the abnormality determination threshold corresponding to the abnormality being used to determine an occurrence of the abnormality; and
  displaying, as the second abnormality, the abnormality from among the plurality of abnormalities having the highest determined rate of abnormality determination.

7. A method for displaying an abnormality of a robot, the method comprising:

detecting, using a motor position detector, a motor position of each of a plurality of shafts of the robot, and obtaining operation values for the robot in operation using the detected motor position of each of the plurality of shafts of the robot;

detecting, in a sensor-less manner, a first abnormality of the robot using the operation values, the first abnormality being a collision of the robot, and displaying the first abnormality; and after the detecting the first abnormality, (i) detecting a second abnormality of the robot using the operation values and (ii) displaying the second abnormality of the robot when a calculation using the operation values is greater than a display determination threshold corresponding to the second abnormality, the second abnormality being different from the first abnormality, wherein the second abnormality is from among a plurality of abnormalities detected using the operation values, and wherein the method further comprises:
  determining, for each of the plurality of abnormalities, a rate of abnormality determination using the operation values and an abnormality determination threshold corresponding to the abnormality, the abnormality determination threshold corresponding to the abnormality being used to determine an occurrence of the abnormality; and
  displaying each of the determined rates of abnormality determination.

8. A method for displaying an abnormality of a robot, the method comprising:

detecting, using a motor position detector, a motor position of each of a plurality of shafts of the robot, and obtaining operation values for the robot in operation using the detected motor position of each of the plurality of shafts of the robot;

detecting, in a sensor-less manner, a first abnormality of the robot using the operation values, the first abnormality being a collision of the robot, and displaying the first abnormality;

after the detecting the first abnormality, (i) detecting a second abnormality of the robot using the operation values and (ii) displaying the second abnormality of the robot when a calculation using the operation values is greater than a display determination threshold corresponding to the second abnormality, the second abnormality being different from the first abnormality;

determining a rate of abnormality determination for the second abnormality using the operation values and an abnormality determination threshold corresponding to the second abnormality, the abnormality determination threshold corresponding to the second abnormality being used to determine an occurrence of the second abnormality; and displaying the determined rate of abnormality determination for the second abnormality.

* * * * *